United States Patent
Kasugai et al.

(10) Patent No.: US 9,146,453 B2
(45) Date of Patent: Sep. 29, 2015

(54) LIGHT-EMITTING DEVICE AND PROJECTION APPARATUS

(71) Applicant: Panasonic Corporation, Osaka (JP)

(72) Inventors: Hideki Kasugai, Shiga (JP); Kiyoshi Morimoto, Osaka (JP); Kazuhiko Yamanaka, Osaka (JP); Takuma Katayama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/487,440

(22) Filed: Sep. 16, 2014

(65) Prior Publication Data

US 2015/0002824 A1  Jan. 1, 2015

Related U.S. Application Data

(63) Continuation of application No. PCT/JP2013/003397, filed on May 29, 2013.

(30) Foreign Application Priority Data

Jun. 21, 2012 (JP) .................... 2012-140087

(51) Int. Cl.
  *G03B 21/20* (2006.01)
  *F21K 99/00* (2010.01)
  (Continued)

(52) U.S. Cl.
  CPC .............. *G03B 21/204* (2013.01); *F21K 9/56* (2013.01); *G02B 26/008* (2013.01);
  (Continued)

(58) Field of Classification Search
  CPC ........ G03B 21/00; G03B 21/14; G03B 21/20; G03B 21/2033; G03B 21/204; F21K 9/56; H04N 9/31; H04N 9/3114
  USPC ................................................ 353/13; 362/84
  See application file for complete search history.

(56) References Cited

U.S. PATENT DOCUMENTS 6,066,861 A  5/2000 Höhn et al.
6,245,259 B1  6/2001 Höhn et al.
(Continued)

FOREIGN PATENT DOCUMENTS

CN  102095155 A  6/2011
JP  11-500584  1/1999
(Continued)

OTHER PUBLICATIONS

International Search Report issued Jul. 30, 2013 in corresponding International Application No. PCT/JP2013/003397.
(Continued)

*Primary Examiner* — Jori S Reilly-Diakun
(74) *Attorney, Agent, or Firm* — Wenderoth, Lind & Ponack, L.L.P.

(57) ABSTRACT

A light-emitting device includes: a semiconductor light-emitting element which emits light of a first wavelength; and a first wavelength conversion unit which includes a first phosphor and emits light of a second wavelength by being excited by the light of the first wavelength. The first phosphor contains europium as an activator. The light of the first wavelength is emitted to the first wavelength conversion unit at 1 kW/cm² or greater. $1 \leq \eta 1_2/\eta 1_1 \leq 1.17$ is satisfied where $\eta 1$ is light output ratio of the light of the first wavelength to the light of the second wavelength, $\eta 1_1$ is light output ratio obtained when the light of the first wavelength is emitted to the first wavelength conversion unit at 5 kW/cm², and $\eta 1_2$ is light output ratio obtained when the light of the first wavelength is emitted to the first wavelength conversion unit at 2.5 kW/cm².

21 Claims, 19 Drawing Sheets

(51) Int. Cl.
    *H04N 9/31*   (2006.01)
    *G02B 26/00*  (2006.01)
    *G03B 33/06*  (2006.01)
    *G03B 33/08*  (2006.01)
    *G03B 33/12*  (2006.01)

(52) U.S. Cl.
    CPC .......... *G03B 21/208* (2013.01); *G03B 21/2013* (2013.01); *G03B 21/2066* (2013.01); *G03B 33/06* (2013.01); *G03B 33/08* (2013.01); *G03B 33/12* (2013.01); *H04N 9/3114* (2013.01); *H04N 9/3158* (2013.01)

(56) References Cited

U.S. PATENT DOCUMENTS

| | | | |
|---|---|---|---|
| 6,277,301 | B1 | 8/2001 | Höhn et al. |
| 6,592,780 | B2 | 7/2003 | Höhn et al. |
| 7,235,189 | B2 | 6/2007 | Höhn et al. |
| 7,276,736 | B2 | 10/2007 | Höhn et al. |
| 7,709,852 | B2 | 5/2010 | Höhn et al. |
| 7,758,224 | B2 | 7/2010 | Hama et al. |
| 8,071,996 | B2 | 12/2011 | Höhn et al. |
| 8,197,111 | B2 | 6/2012 | Hama et al. |
| 8,337,027 | B2 | 12/2012 | Ogura et al. |
| 8,450,922 | B2 | 5/2013 | Hirrle et al. |
| 8,780,438 | B2 * | 7/2014 | Hamada et al. ............... 359/326 |
| 8,854,725 | B2 * | 10/2014 | Hamada et al. ............... 359/326 |
| 2001/0028053 | A1 | 10/2001 | Hohn et al. |
| 2001/0045647 | A1 | 11/2001 | Höhn et al. |
| 2004/0016908 | A1 | 1/2004 | Hohn et al. |
| 2004/0084687 | A1 | 5/2004 | Hohn et al. |
| 2007/0216281 | A1 | 9/2007 | Hohn et al. |
| 2007/0278935 | A1 * | 12/2007 | Harada ........................ 313/503 |
| 2008/0089089 | A1 | 4/2008 | Hama et al. |
| 2010/0176344 | A1 | 7/2010 | Höhn et al. |
| 2010/0202129 | A1 * | 8/2010 | Abu-Ageel .................... 362/84 |
| 2010/0253918 | A1 * | 10/2010 | Seder et al. .................... 353/13 |
| 2010/0254153 | A1 | 10/2010 | Hama et al. |
| 2010/0270909 | A1 | 10/2010 | Hirrle et al. |
| 2011/0051102 | A1 * | 3/2011 | Ogura et al. .................... 353/85 |
| 2012/0008647 | A1 * | 1/2012 | Matsuda et al. .................. 372/5 |
| 2012/0106186 | A1 | 5/2012 | Kishimoto et al. |
| 2014/0285997 | A1 * | 9/2014 | Nitta et al. ....................... 362/84 |
| 2015/0060916 | A1 * | 3/2015 | Nagasaki et al. ............... 257/98 |

FOREIGN PATENT DOCUMENTS

| | | |
|---|---|---|
| JP | 11-64789 | 3/1999 |
| JP | 2000-223750 | 8/2000 |
| JP | 2003-110150 | 4/2003 |
| JP | 2004-341105 | 12/2004 |
| JP | 2007-004200 | 1/2007 |
| JP | 2011-53320 | 3/2011 |
| JP | 2011-506655 | 3/2011 |
| JP | 4829470 | 12/2011 |
| JP | 2012-099282 | 5/2012 |
| WO | 98/12757 | 3/1998 |
| WO | 2006/038502 | 4/2006 |
| WO | 2009/077278 | 6/2009 |

OTHER PUBLICATIONS

Office Action issued Apr. 29, 2015 in corresponding Chinese Patent Application No. 201380015184.2 (with English translation of Search Report).

* cited by examiner

LIGHT-EMITTING DEVICE AND PROJECTION APPARATUS

CROSS REFERENCE TO RELATED APPLICATIONS

This is a continuation application of PCT International Application No. PCT/JP2013/003397 filed on May 29, 2013, designating the United States of America, which is based on and claims priority of Japanese Patent Application No. 2012-140087 filed on Jun. 21, 2012. The entire disclosures of the above-identified applications, including the specifications, drawings and claims are incorporated herein by reference in their entirety.

FIELD

The present disclosure relates to light-emitting devices and projection apparatuses. For example, the present disclosure relates to: a projection apparatus, such as a business projector, a home projector, or a pico projector; a light-emitting device used as a light source for a rear-projection television, a head-up display or the like; and a projection apparatus including the light-emitting device. In particular, the present disclosure relates to a light-emitting device and a projection apparatus which provide high light output, reduced speckle pattern, and highly directive light.

BACKGROUND

In recent years, an increasing number of light sources for general illumination such as an incandescent light bulb and fluorescent lights have been replaced with white light-emitting diodes (LEDs). Other than the above light sources for general illumination, there are also illumination light sources such as recessed lights for a shop, headlights of a car and the like, and projector light sources. Such light sources include halogen lamps, high-pressure mercury lamps, metal halide lamps and the like. Of these, high intensity discharge lamps, such as a high-pressure mercury lamp or a metal halide lamp, use arc discharge, so that highly directive light can be emitted efficiently and at high power. However, such high intensity discharge lamps have the following disadvantages: stabilization of light output after lighting takes time; environmental burden is large due to inclusion of mercury; and the time it takes until luminance is halved, which is defined as the end of the life, is short.

In order to overcome such disadvantages, recent years have seen intensive development of light-emitting devices which include semiconductor light-emitting elements, such as LEDs or semiconductor lasers, as light sources or excitation light sources. Various structures of the light-emitting device including the semiconductor light-emitting elements are available depending on the intended use. One example is a light-emitting device which varies emission wavelengths in the visible light range (430 nm to 660 nm) by including different semiconductor materials or compositions. Another example is a light-emitting device which varies emission wavelengths or emission spectra by including phosphors in combination.

For example, patent literature (PTL) 1 and 2 disclose a white LED which includes an LED in combination with a phosphor having a host material that is aluminate or ortho-silicate and containing europium (Eu) as an activator.

PTL 3 discloses another example of phosphor materials. PTL 3 discloses a white LED including a blue LED, which emits blue light of a wavelength ranging from 430 nm to 460 nm, in combination with a so-called YAG phosphor having a host material that is $(Y,Gd)_3(Al, Ga)_5O_{12}$ and containing cerium (Ce) as an activator. The white LED including the YAG phosphor exhibits high wall plug efficiency (WPE). The YAG phosphor, however, has properties in which the absorption spectrum has a peak in a wavelength ranging from 440 nm to 450 nm. Such properties result in decreased conversion efficiency of light of a wavelength different from the wavelength of the blue light, or result in the emission spectrum peak ranging from 530 nm to 590 nm (greenish yellow to orange). Hence, the spectrum of the white LED using the above materials is so-called quasi-white that is obtained by mixing the blue light directly emitted from the blue LED and the yellow light emitted from the phosphor.

Light-emitting devices such as the white LEDs including the semiconductor light-emitting elements have been widely used for general illumination as described above. On the other hand, intensive development of such light-emitting devices has also been made for various illumination purposes, by improving properties other than the conversion efficiency of emitted light from the light-emitting devices. In particular, replacement of the light-emitting devices including the semiconductor light-emitting elements is expected to progress further by improving the following properties. The properties are: directivity of a light-emitting unit, such as Etendue; color reproducibility (correctness in chromaticity coordinates) of white light; and conversion efficiency, color purity, and speckle properties of three primary colors (blue, green, and red).

Of those properties, relative to a light-emitting device used for display applications, there is a strong demand particularly for color reproducibility, such as a demand for accuracy of $1/100$ in chromaticity coordinates. In response to such a demand, for example, PTL 4 discloses a light-emitting device which includes semiconductor lasers in combination which respectively emit blue light, green light, and red light. PTL 5 discloses a light-emitting device which includes semiconductor lasers which emit blue light, a $Y_3(Al,Ga)_5O_{12}$ phosphor (green phosphor), and a CASN phosphor (red phosphor) in combination. However, emitted light of three primary colors from these light-emitting devices partially or entirely includes light directly emitted from the semiconductor lasers. Hence, there are a safety problem that occurs when the emitted light directly enters an eye of a user, and a problem of decrease in image quality caused by speckle noise that occurs due to coherency.

In order to solve such problems, PTL 6 discloses a light-emitting device which emits light of three primary colors entirely from phosphors. The light-emitting device includes a semiconductor light-emitting element which emits ultraviolet light, in combination with a circular plate provided with a red phosphor layer, a green phosphor layer, and a blue phosphor layer. Referring to FIG. 20, a description is given below of a conventional light-emitting device disclosed in PTL 6.

As FIG. 20 illustrates, a conventional light-emitting device includes: light-emitting diodes 1003 which emit ultraviolet light; and a color wheel 1004 provided with three phosphor layers respectively including a red phosphor, a green phosphor, and a blue phosphor in partitioned regions. The color wheel 1004 is rotated, so that the color of light emitted from the light-emitting diodes 1003 is sequentially converted, for example, in the order of red, green and then blue. The light-emitting device is driven such that white light is emitted in time-averaged observation. In this structure, $(Sr,Ca,Ba,Mg)_{10}(PO_4)_6C_{12}$:Eu or $(Ba,Mg)Al_{10}O_{17}$:Eu is used as a blue phosphor, ZnS:Cu, Al or $(Ba,Mg)Al_{10}O_{17}$:(Eu,Mn) is used as a green phosphor, and $Y_2O_2S$:Eu is used as a red phosphor.

Moreover, PTL 7 discloses that when an LED is used as a light source, luminous efficacy can be optimized by making the Eu concentration in an Eu-activated $BaMgAl_{10}O_{17}$ phosphor 20 mol % or greater.

CITATION LIST

Patent Literature

[PTL 1] Japanese Unexamined Patent Application Publication No. 11-500584
[PTL 2] Japanese Unexamined Patent Application Publication No. 2003-110150
[PTL 3] Japanese Unexamined Patent Application Publication No. 2000-223750
[PTL 4] Japanese Unexamined Patent Application Publication No. 11-064789
[PTL 5] Japanese Unexamined Patent Application Publication No. 2011-53320
[PTL 6] Japanese Unexamined Patent Application Publication No. 2004-341105
[PTL 7] Japanese Unexamined Patent Application Publication No. 2011-506655

SUMMARY

Technical Problem

With the conventional structure, the inventors actually manufactured a light-emitting device which provides small Etendue to enhance directivity of emitted light, and evaluated change (decrease) in light intensity of excitation light sources that occurs when the light-emitting device operates at high temperature or over long period. Then, the inventers have found the following problem: the balance of energy conversion efficiency from incident light to fluorescence (wavelength converted light) of plural phosphors (light output ratio) is changed and the chromaticity coordinates of the emission spectrum of the light-emitting device is changed, resulting in change in color reproducibility.

More specifically, a phosphor layer, which includes a blue phosphor comprising $(Ba,Mg)Al_{10}O_{17}$:Eu, and a green phosphor comprising $(Sr,Ba)_2SiO_4$:Eu that is representative orthosilicate containing europium as an activator, was formed on a holding member having sufficient heat dissipation properties, and light of a wavelength of 405 nm was focused onto the phosphor layer. One finding is that the energy conversion efficiency rapidly decreases when the excitation light density exceeds 1 $kW/cm^2$, due to phenomenon referred to as light saturation.

Another finding is that the amount of decrease in the energy conversion efficiency significantly differs between $(Ba,Mg)Al_{10}O_{17}$:Eu and $(Sr,Ba)_2SiO_4$:Eu.

On the other hand, when light of a wavelength of 450 nm was focused onto a phosphor layer including a YAG phosphor, the energy conversion efficiency did not rapidly decrease.

In order to analyze the evaluation results in detail, researches were done on the properties of various phosphors, and the following was found. Light saturation is unlikely to occur in a phosphor containing Ce as an activator (Ce-activated phosphor) which is typified by the YAG phosphor, due to its short fluorescence life, whereas light saturation is likely to occur in a phosphor containing Eu or manganese (Mn) as an activator, due to its long fluorescence life.

As described above, however, a Ce-activated phosphor, such as the YAG phosphor, cannot emit blue fluorescence; and thus, part of the blue light emitted from the semiconductor lasers needs to be emitted without wavelength conversion.

The present disclosure has been conceived to solve such problems of the conventional techniques. One non-limiting and exemplary embodiment provides a light-emitting device which converts emitted light from semiconductor light-emitting elements such as semiconductor lasers into fluorescence using plural phosphors, emits the converted light, and have small change in color reproducibility of the emission spectrum even when intensity of emitted light from the semiconductor light-emitting elements changes.

Solution to Problem

One non-limiting and exemplary embodiment provides a light-emitting device including: a semiconductor light-emitting element which emits light of a first wavelength; and a first wavelength conversion unit including at least one type of a first phosphor and configured to emit light of a second wavelength by being excited by the light of the first wavelength, the light of the second wavelength being different from the light of the first wavelength, in which the first phosphor contains europium (Eu) as an activator, the light of the first wavelength is emitted to the first wavelength conversion unit at a light density of 1 $kW/cm^2$ or greater, and a relation of $1 \leq \eta 1_2/\eta 1_1 \leq 1.17$ is satisfied where $\eta 1$ is a light output ratio of the light of the first wavelength incident on the first wavelength conversion unit to the light of the second wavelength emitted from the first wavelength conversion unit, $\eta 1_1$ is a light output ratio obtained when the light of the first wavelength is emitted to the first wavelength conversion unit at a light density of 5 $kW/cm^2$, and $\eta 1_2$ is a light output ratio obtained when the light of the first wavelength is emitted to the first wavelength conversion unit at a light density of 2.5 $kW/cm^2$.

Small Etendue can be obtained by making the density of light with a first wavelength emitted from the semiconductor light-emitting element to the first wavelength conversion unit 1 $kW/cm^2$ or greater. Moreover, by satisfying the relation of $1 \leq \eta 1_2/\eta 1_1 \leq 1.17$ where $\eta 1_1$ is a light output ratio obtained when the light density is 5 $kW/cm^2$ and $\eta 1_2$ is a light output ratio obtained when the light density is 2.5 $kW/cm^2$, change in energy conversion efficiency (light output ratio) of the first phosphor can be reduced even when the density of the excitation light (light of the first wavelength) emitted to the first phosphor of the first wavelength conversion unit (phosphor layer) changes. Accordingly, it is possible to achieve a light-emitting device which emits light with high luminance and small color deviation even when light output of the light (light of the first wavelength) emitted from the semiconductor light-emitting element in the light-emitting device changes.

Moreover, it may be that the semiconductor light-emitting element emits light of a wavelength ranging from 380 nm to 430 nm as the light of the first wavelength.

Moreover, it may be that the first phosphor absorbs the light of the first wavelength emitted from the semiconductor light-emitting element, the first wavelength ranging from 380 nm to 430 nm.

Accordingly, light in the visible light range, in particular light other than blue light, can be used as excitation light for phosphors. Hence, laser light is not used as emitted light from the light-emitting device, so that it is possible to provide emitted light that is safe and does not include speckle noise.

Moreover, it may be that the first phosphor has a peak fluorescence wavelength ranging from 430 nm to 660 nm.

Accordingly, it is possible to achieve a light-emitting device which emits light with a wavelength in the visible light range, high luminance, and small color deviation.

Moreover, it may be that the first phosphor has the peak fluorescence wavelength ranging from 430 nm to 500 nm.

Accordingly, it is possible to achieve a light-emitting device which emits fluorescence which: has an emission wavelength in the blue light range; is safe and has high luminance; and includes no speckle noise.

Moreover, it may be that the first phosphor has an Eu concentration x, where x≤7 mol %.

Moreover, it may be that the first phosphor is either (i) a phosphor containing: at least one element selected from a group consisting of Sr, Ca, and Ba; Mg oxide; and Si oxide or (ii) a phosphor containing Ba, Mg oxide, and Al oxide.

In this case, it may be that the first phosphor is the phosphor containing: at least one element selected from the group consisting of Sr, Ca, and Ba; Mg oxide; and Si oxide, and has an Eu concentration x, where x≤2 mol %.

Such structures allow Etendue to be small. Hence, even when light is emitted to the first wavelength conversion unit (phosphor layer) at a high excitation light density, it is possible to achieve a light-emitting device which emits fluorescence with high luminance and small change in energy conversion efficiency even when light output of light emitted from the semiconductor light-emitting elements changes.

Moreover, it may be that the first phosphor is the phosphor containing: at least one element selected from the group consisting of Sr, Ca, and Ba; Mg oxide; and Si oxide, and has an average particle size ranging from 2 μm to 20 μm.

With this, it is possible to increase the energy conversion efficiency of the first wavelength conversion unit (phosphor layer) which emits blue light.

On the other hand, it may be that the first phosphor is the phosphor containing Ba, Mg oxide, and Al oxide, and has an Eu concentration x, where x≤7 mol %.

Such a structure allows Etendue to be small. Hence, even when light is emitted to the first wavelength conversion unit (phosphor layer) at a high excitation light density, it is possible to achieve a light-emitting device which emits blue light with high luminance and small change in energy conversion efficiency even when light output of light emitted from the semiconductor light-emitting elements changes.

Moreover, the light-emitting device according to an embodiment may include a second wavelength conversion unit which includes a second phosphor which emits light of a wavelength ranging from 500 nm to 650 nm.

Moreover, it may be that a relation of $1 \leq \eta 2_2/\eta 2_1 \leq 1.17$ is satisfied where $\eta 2$ is a light output ratio of the light of the first wavelength incident on the second wavelength conversion unit to the light emitted from the second wavelength conversion unit, $\eta 2_1$ is a light output ratio obtained when the light of the first wavelength is emitted to the second wavelength conversion unit at a light density of 5 kW/cm$^2$, and $\eta 2_2$ is a light output ratio obtained when the light of the first wavelength is emitted to the second wavelength conversion unit at a light density of 2.5 kW/cm$^2$.

Moreover, it may be that the second phosphor comprises an aluminate phosphor containing Ce as an activator.

Moreover, it may be that the second phosphor comprises Ce-activated $Y_3(Al,Ga)_5O_{12}$. In this case, it may be that the second phosphor has an absorption spectrum with a maximum value ranging from wavelengths of 430 nm to 460 nm.

Even when light is emitted to the second wavelength conversion unit (phosphor layer) at a high excitation light density, use of a Ce-activated $Y_3(Al,Ga)_5O_{12}$ phosphor as a second phosphor allows a light-emitting device to emit light with high luminance and small change in energy conversion efficiency even when light output from the semiconductor light-emitting elements changes.

Moreover, the light-emitting device according to an embodiment may include a third wavelength conversion unit which includes a third phosphor which emits light of a wavelength ranging from 580 nm to 660 nm.

Moreover, it may be that a relation of $1 \leq \eta 3_2/\eta 3_1 \leq 1.17$ is satisfied when $\eta 3$ is a light output ratio of the light of the first wavelength incident on the third wavelength conversion unit to the light emitted from the third wavelength conversion unit, $\eta 3_1$ is a light output ratio obtained when the light of the first wavelength is emitted to the third wavelength conversion unit at a light density of 5 kW/cm$^2$, and $\eta 3_2$ is a light output ratio obtained when the light of the first wavelength is emitted to the third wavelength conversion unit at a light density of 2.5 kW/cm$^2$.

Moreover, it may be that the third phosphor comprises an aluminate phosphor containing Ce as an activator.

Moreover, it may be that the third phosphor comprises Ce-activated $(Y,Gd)_3(Al,Ga)_5O_{12}$.

With such structures, it is possible to achieve a light-emitting device which emits fluorescence with an emission wavelength in the red light range, high luminance, and reduced speckle noise. Moreover, combination of the first phosphor which emits blue light with a small efficiency variation coefficient (light saturation coefficient) of conversion efficiency, the second phosphor which emits green light, and the third phosphor which emits red light allows a light-emitting device to emit light with high color rendering property and small color deviation even when light output from the semiconductor light-emitting devices changes.

Furthermore, it may be that the semiconductor light-emitting element includes at least one semiconductor laser.

With this, it is possible to easily cause the semiconductor light-emitting elements to emit light (light of the first wavelength) to the wavelength conversion unit (phosphor layer) at an excitation light density of 1 kW/cm$^2$ or greater; and thus, it is possible to provide a light-emitting device which emits light with high luminance.

Moreover, a projection apparatus according to an aspect of the present disclosure includes any one of the light-emitting devices above; and a red semiconductor light-emitting element which emits light with a peak wavelength ranging from 580 nm to 660 nm With this, it is possible to achieve a projection apparatus which has a small number of types of semiconductor light-emitting elements and which emits light whose color can be easily adjusted.

Advantageous Effects

According to the present disclosure, it is possible to provide a light-emitting device and a projection apparatus which include phosphors having high conversion efficiency and have small change in color reproducibility of emission spectrum of the light-emitting device even when the intensity of light (light of the first wavelength) emitted from the semiconductor light-emitting elements changes.

BRIEF DESCRIPTION OF DRAWINGS

These and other objects, advantages and features of the invention will become apparent from the following description thereof taken in conjunction with the accompanying drawings that illustrate a specific embodiment of the present invention.

Figure 2:
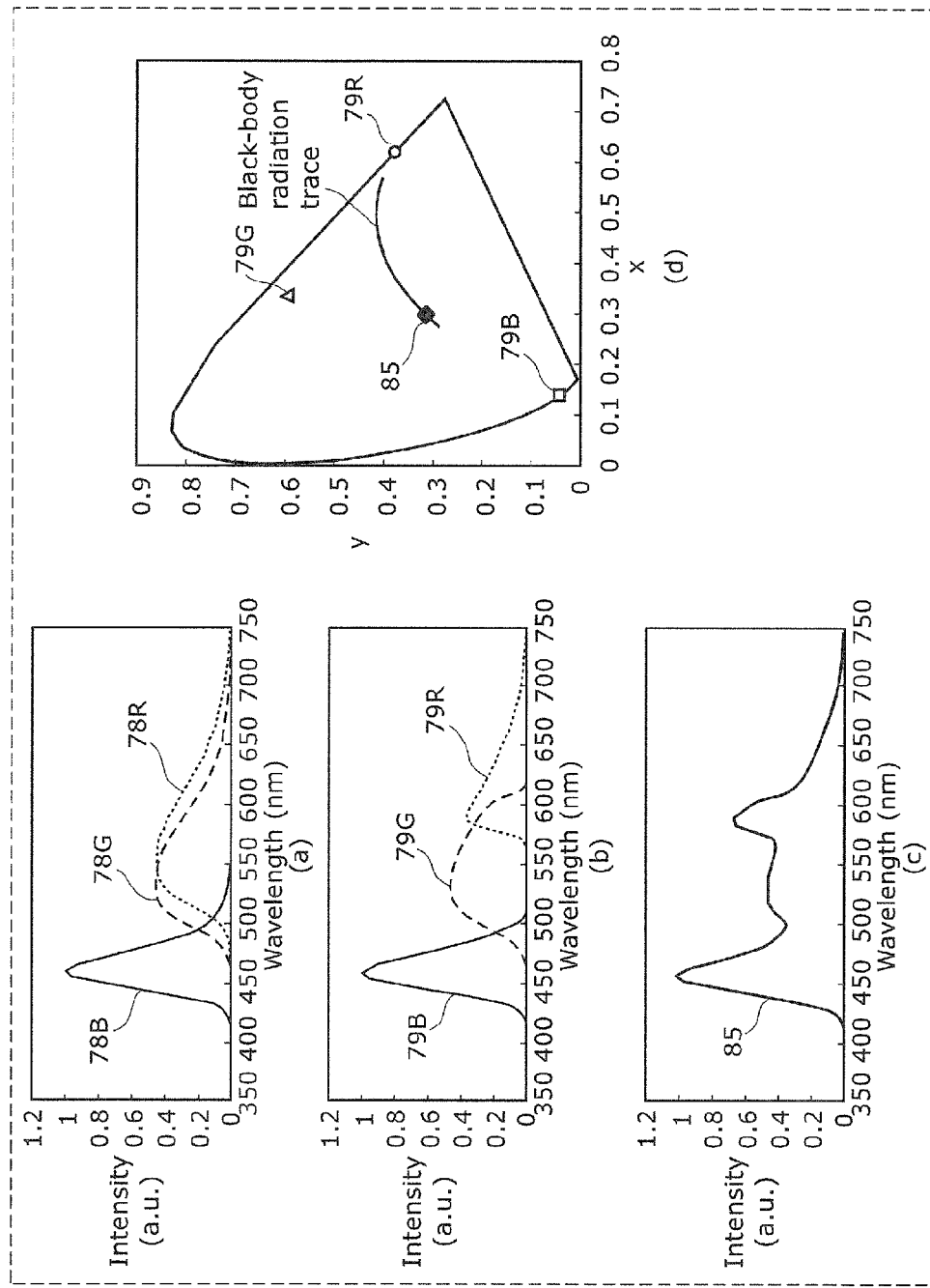

(a) of FIG. 2 illustrates spectra of light emitted from phosphor layers according to Embodiment 1, (b) of FIG. 2 illustrates spectra of light respectively emitted from wavelength cutoff filters according to Embodiment 1, (c) of FIG. 2 illustrates a spectrum of white light emitted from a dichroic prism according to Embodiment 1, and (d) of FIG. 2 illustrates color coordinates of blue light, green light, red light, and white light emitted from the dichroic prism according to Embodiment 1.

Figure 3:
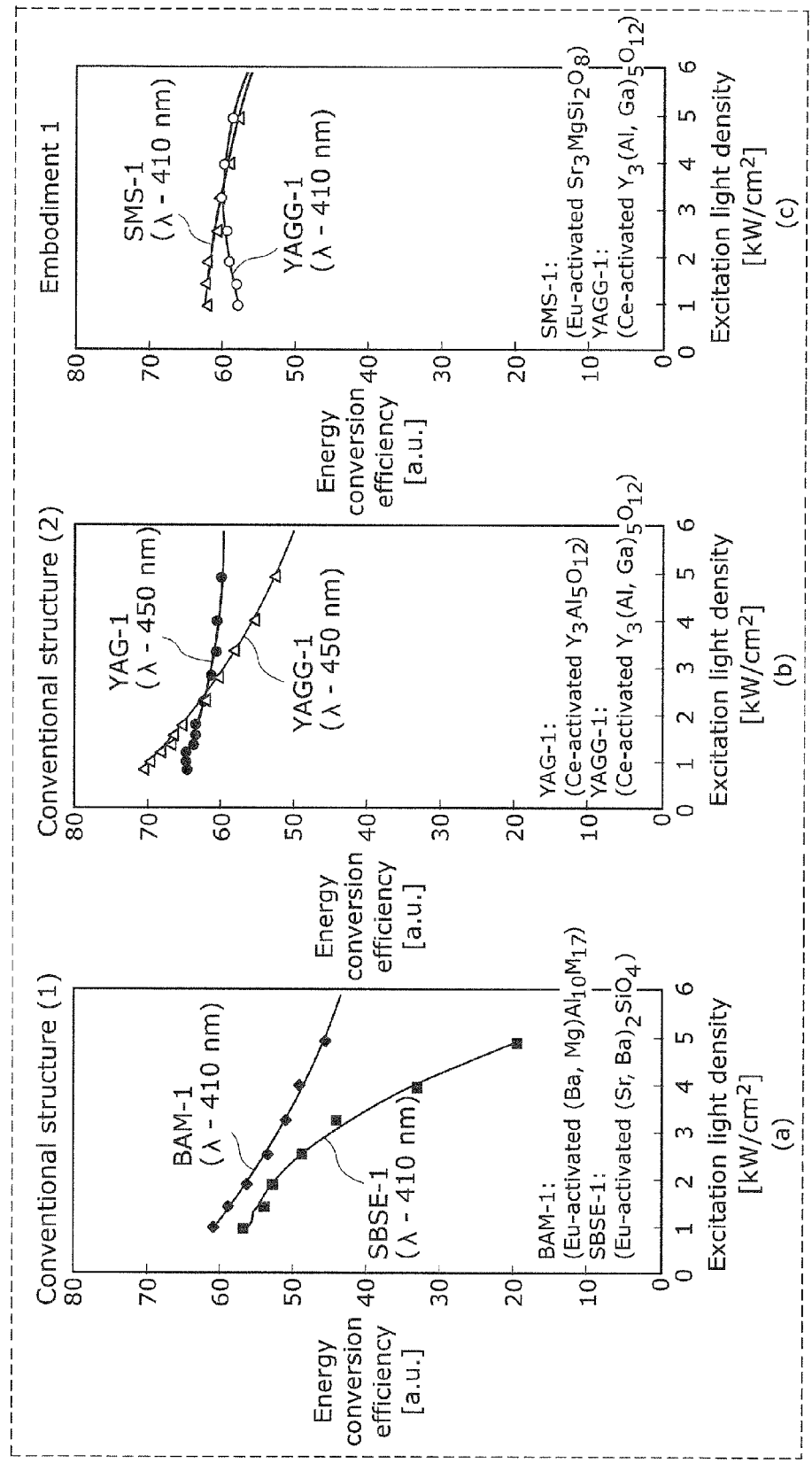

(a) of FIG. 3 illustrates a relationship between energy conversion efficiency of phosphor layers and excitation light density according to conventional structure (1), (b) of FIG. 3 illustrates a relationship between energy conversion efficiency of phosphor layers and excitation light density according to conventional structure (2), and (c) of FIG. 3 illustrates a relationship between energy conversion efficiency of phosphor layers and excitation light density according to Embodiment 1.

Figure 4:
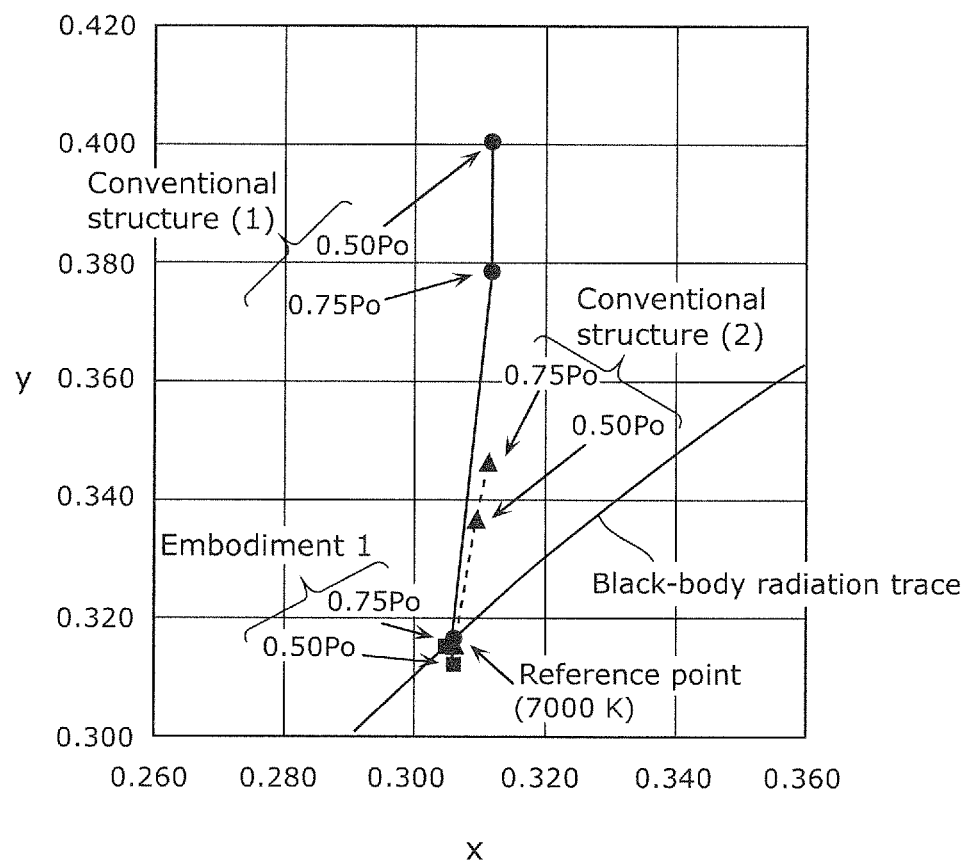

FIG. 4 is a comparison chart of excitation light density dependency of chromaticity coordinates of white light between Embodiment 1 and the conventional structures.

Figure 5:
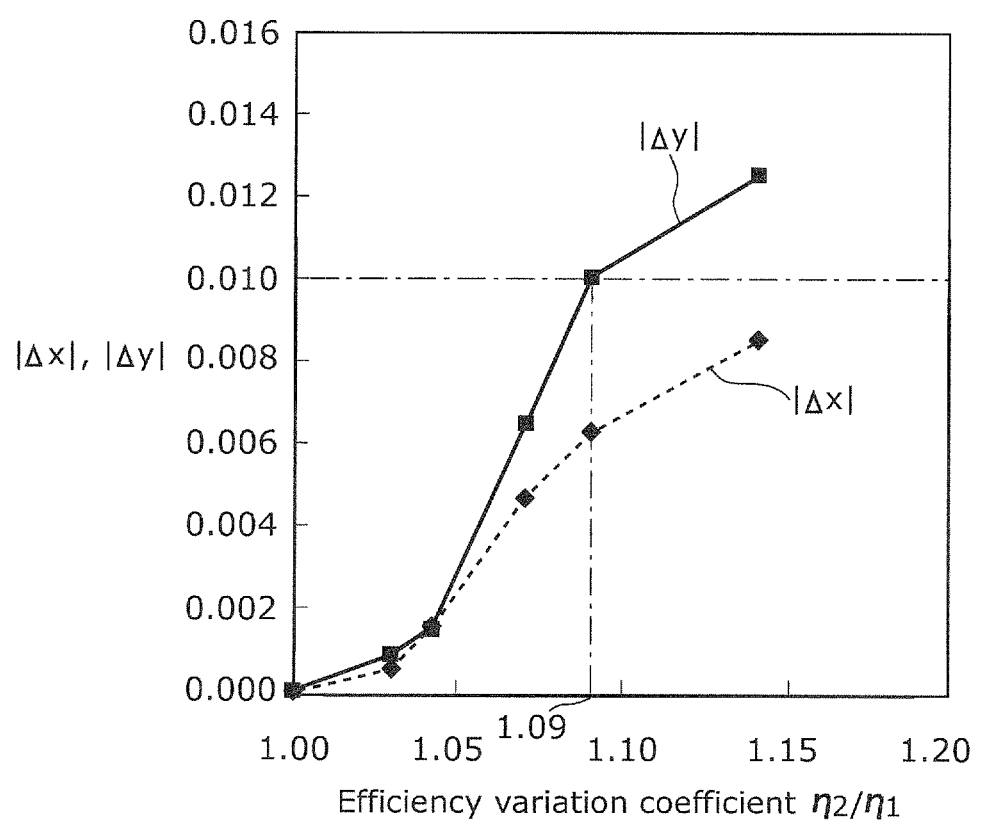

FIG. 5 illustrates a relationship between efficiency variation coefficient $\eta X_2/\eta X_1$ and color deviation amount $|\Delta x|$ and $|\Delta y|$ of chromaticity coordinates of white light according to Embodiment 1.

Figure 6:
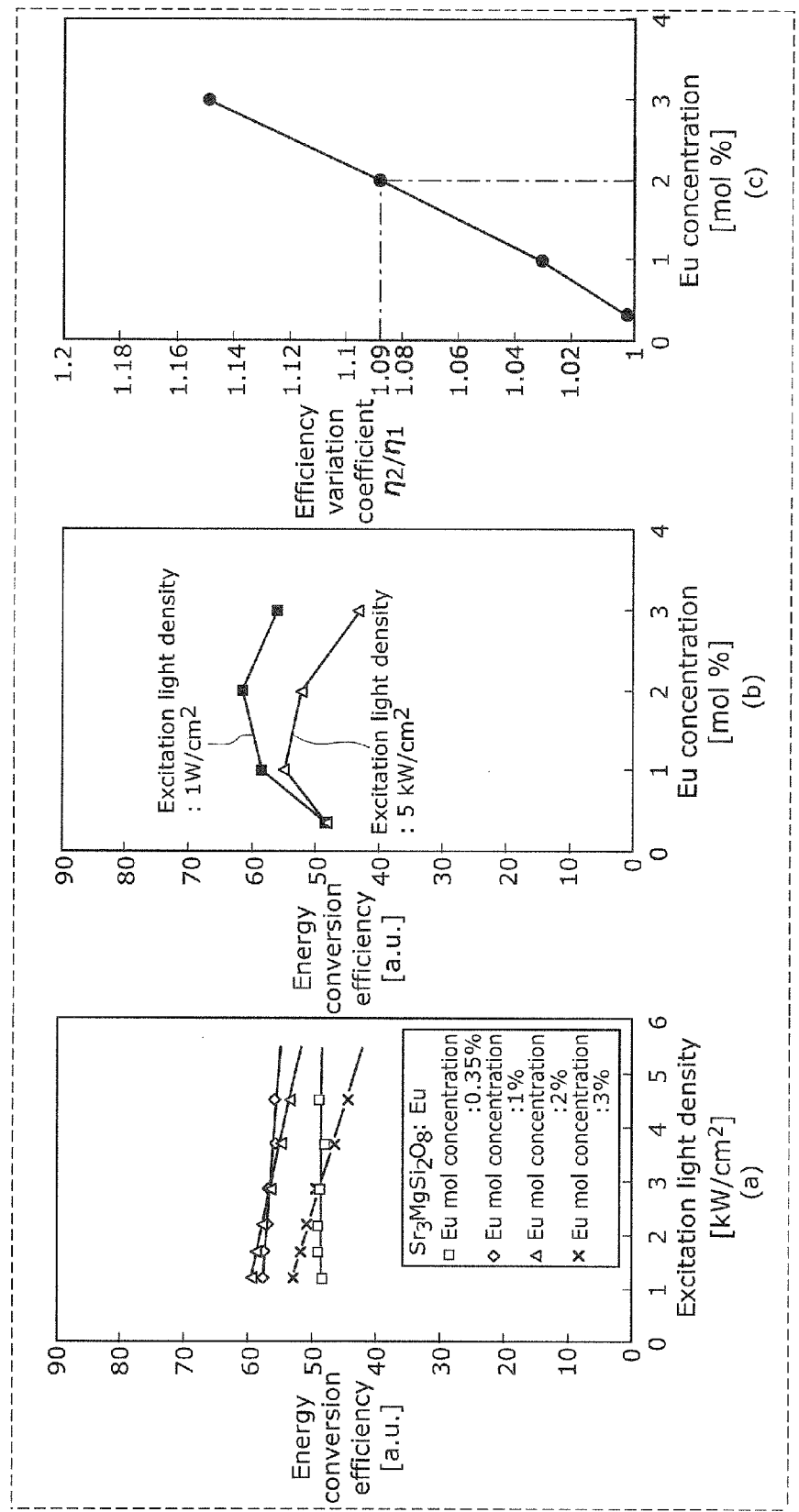

(a) of FIG. 6 illustrates energy conversion efficiency of Eu-activated SMS phosphors according to Embodiment 1, (b) of FIG. 6 illustrates energy conversion efficiency of Eu-activated SMS phosphors according to Embodiment 1, and (c) of FIG. 6 illustrates a relationship between Eu concentration and efficiency variation coefficient $\eta X_2/\eta X_1$.

Figure 7:
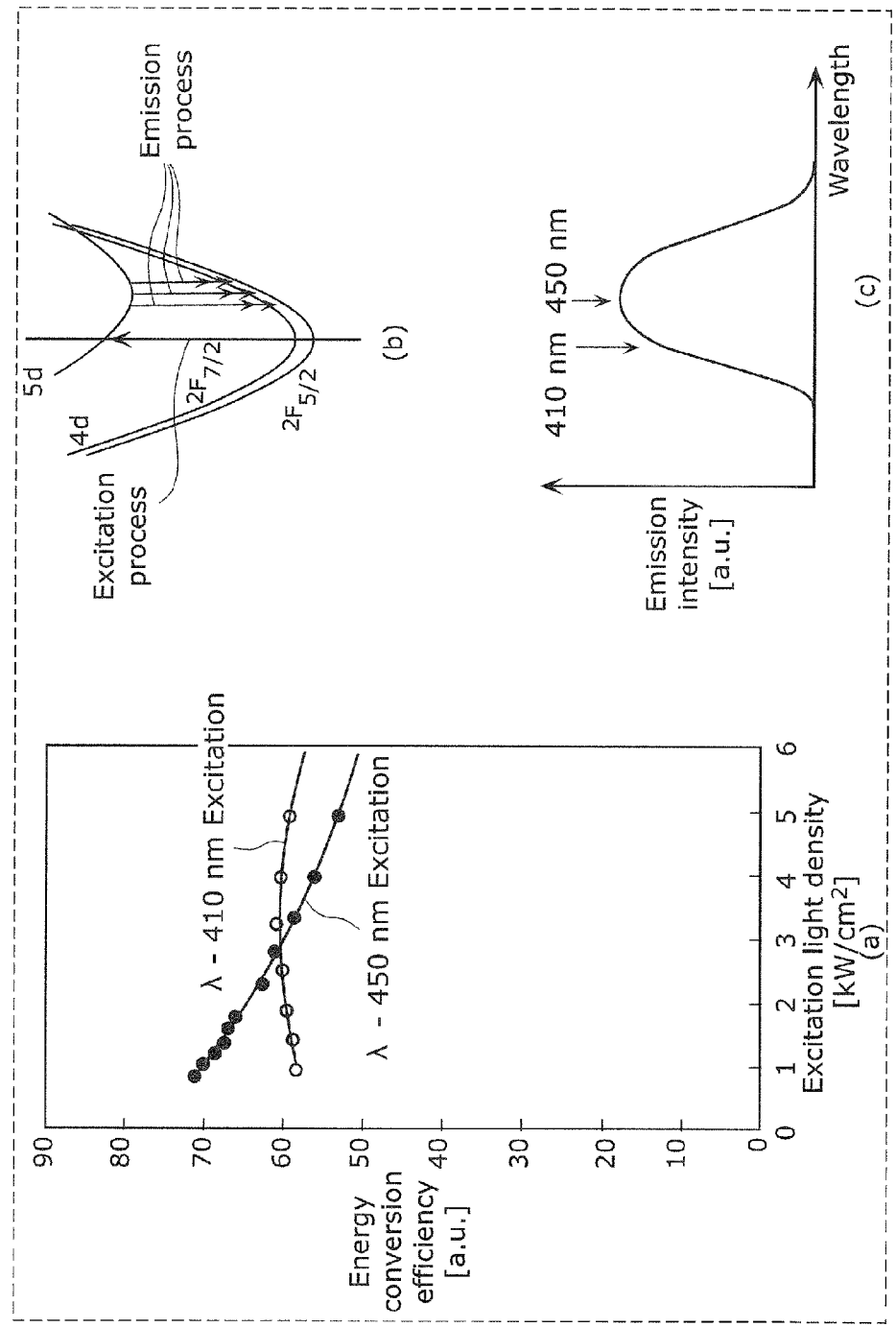

(a) of FIG. 7 illustrates a relationship between excitation light density and energy conversion efficiency of a Ce-activated YAG phosphor according to Embodiment 1, (b) of FIG. 7 is a diagram for describing effects of the Ce-activated YAG phosphor according to Embodiment 1, and (c) of FIG. 7 is another diagram for describing the effects of the Ce-activated YAG phosphor according to Embodiment 1.

Figure 8:
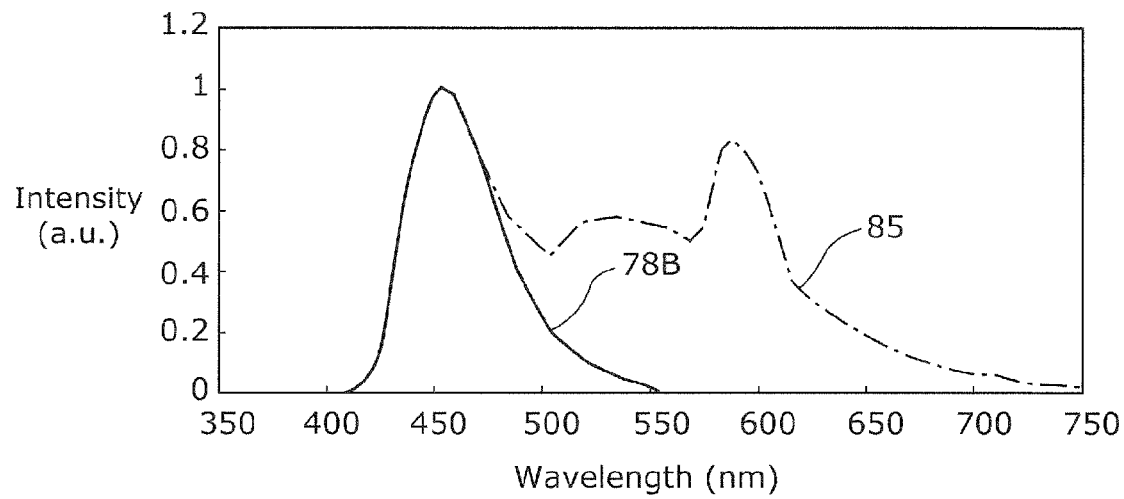

FIG. 8 illustrates spectra of blue light and white light of a light-emitting device according to Embodiment 2.

Figure 9:
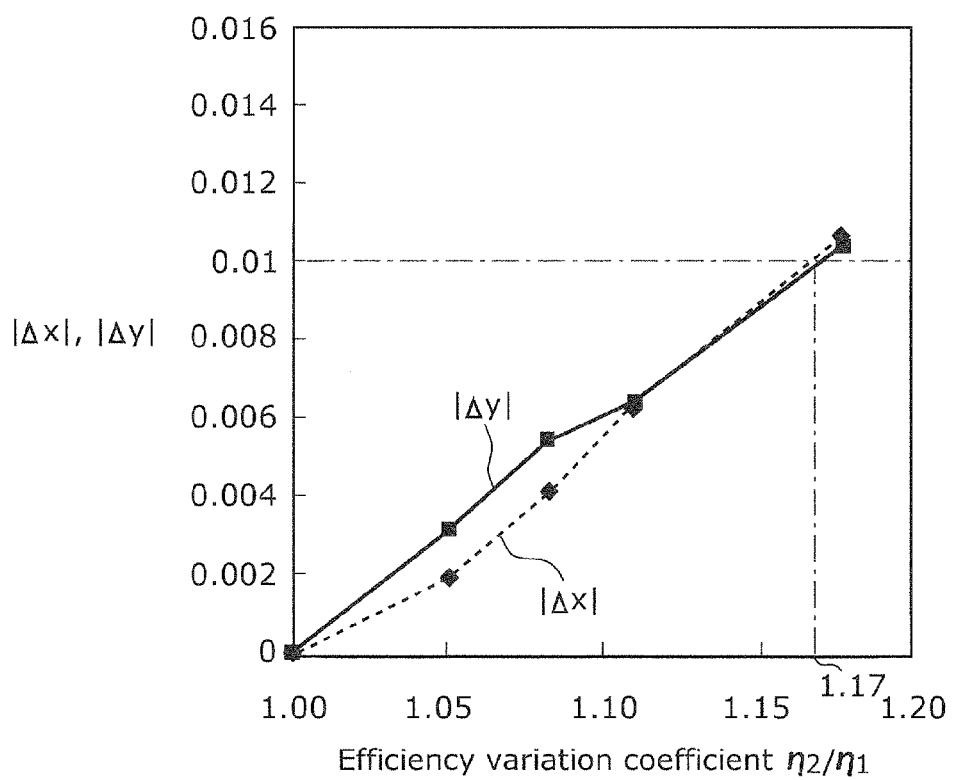

FIG. 9 illustrates a relationship between values of efficiency variation coefficient $\eta X_2/\eta X_1$, deviation amount $|\Delta x|$ and $|\Delta y|$ of chromaticity coordinates of white light emitted from the light-emitting device, and excitation light density, according to Embodiment 2.

Figure 10:
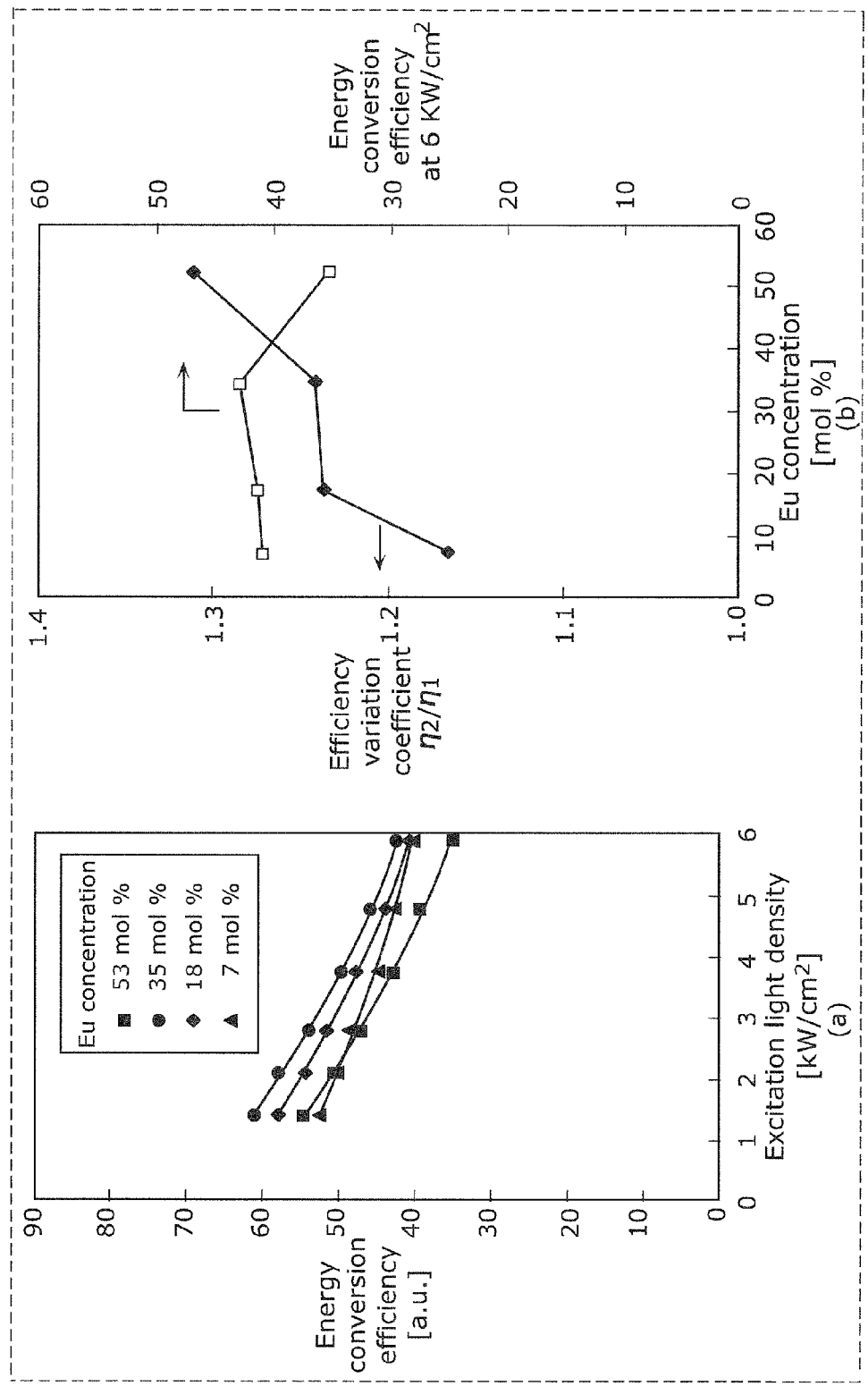

(a) of FIG. 10 illustrates excitation light density dependency of energy conversion efficiency of an Eu-activated $(Ba,Mg)Al_{10}O_{17}$ phosphor used in Embodiment 2, and (b) of FIG. 10 illustrates a relationship between Eu concentration and efficiency variation coefficient $\eta X_2/\eta X_1$ of the Eu-activated $(Ba,Mg)Al_{10}O_{17}$ phosphors used in Embodiment 2.

Figure 11:
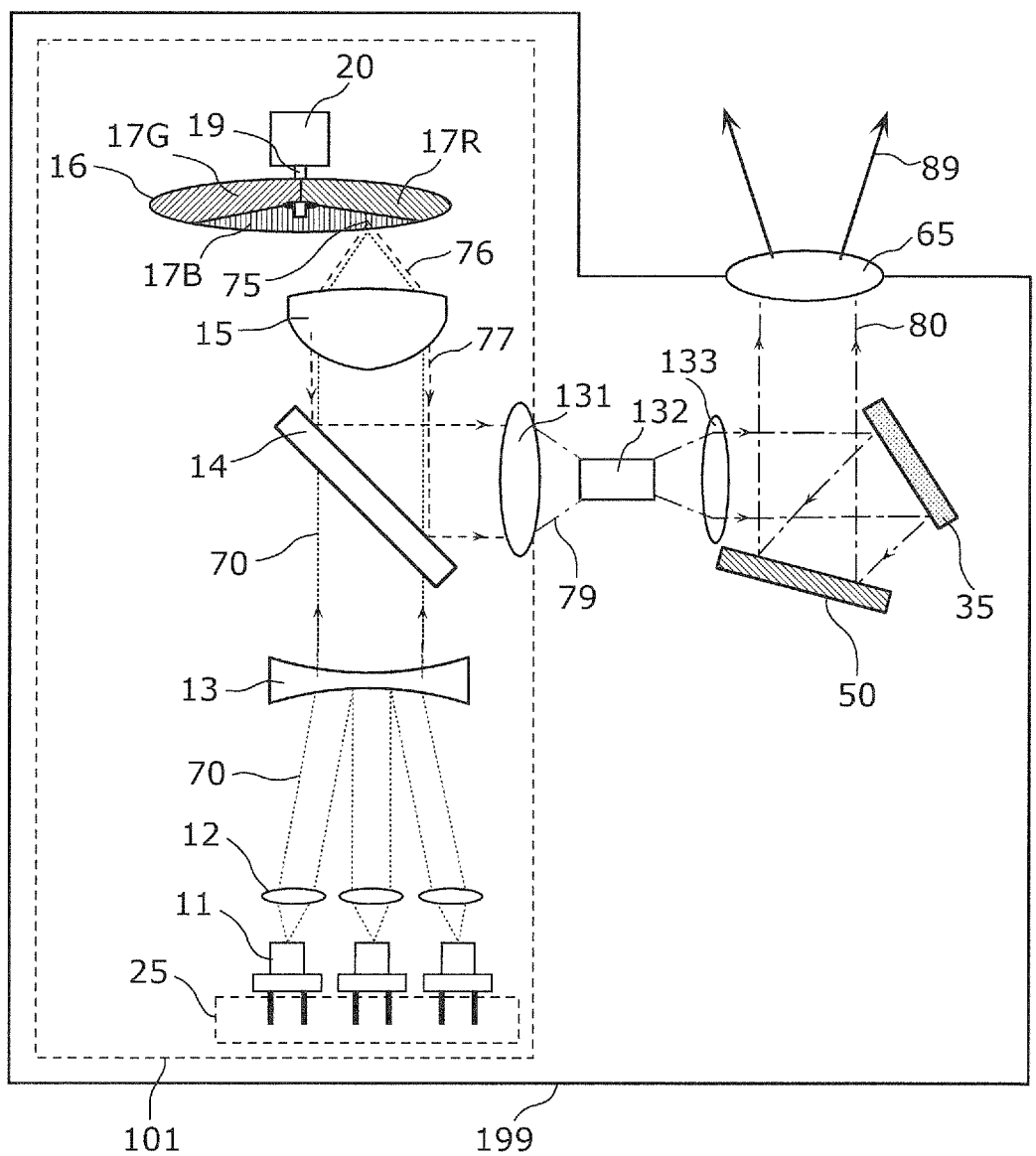

FIG. 11 illustrates structures of a light-emitting device and a projection apparatus according to Embodiment 3.

Figure 12:
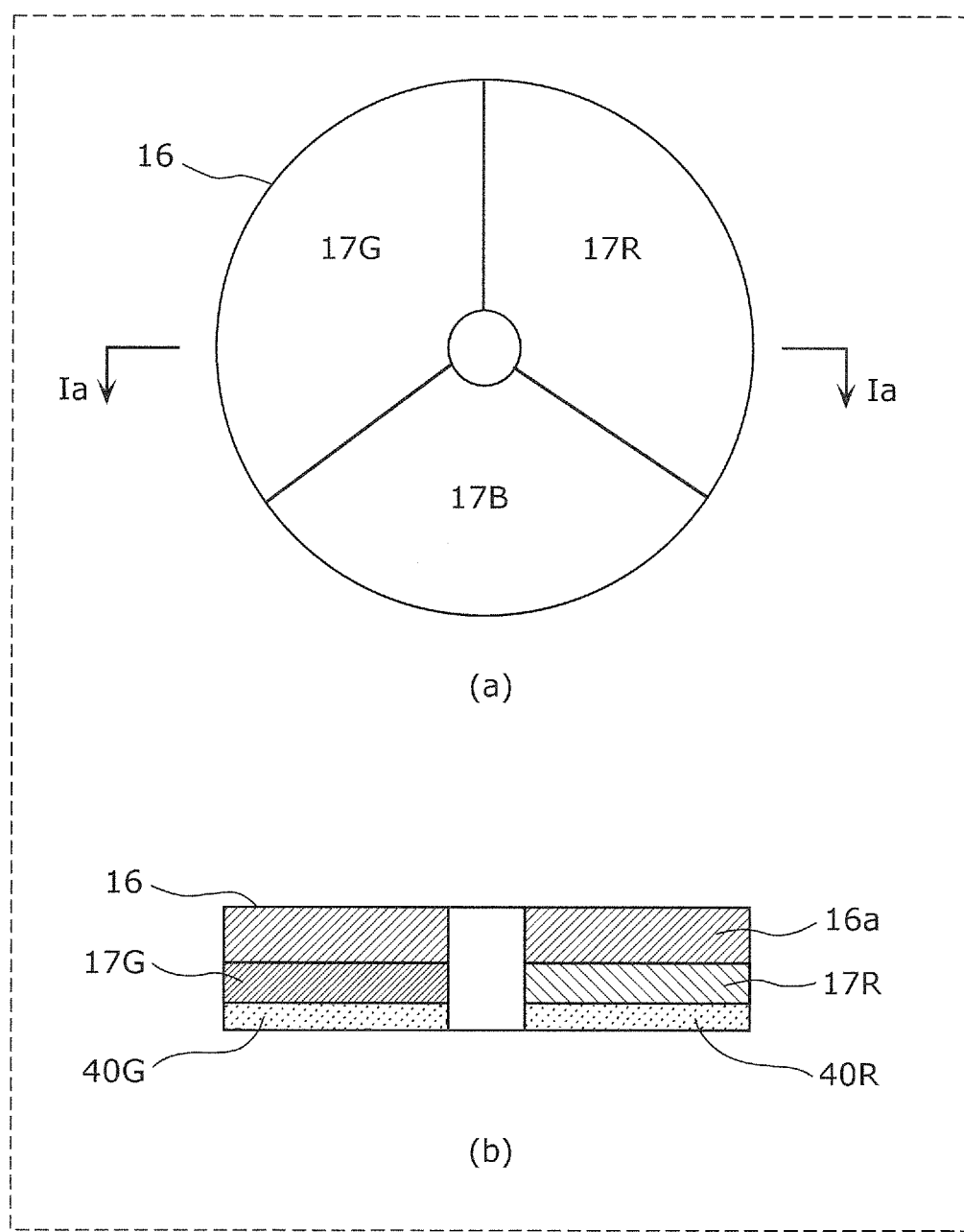

FIG. 12 illustrates a structure of a wavelength conversion unit in the light-emitting device according to Embodiment 3.

Figure 13:
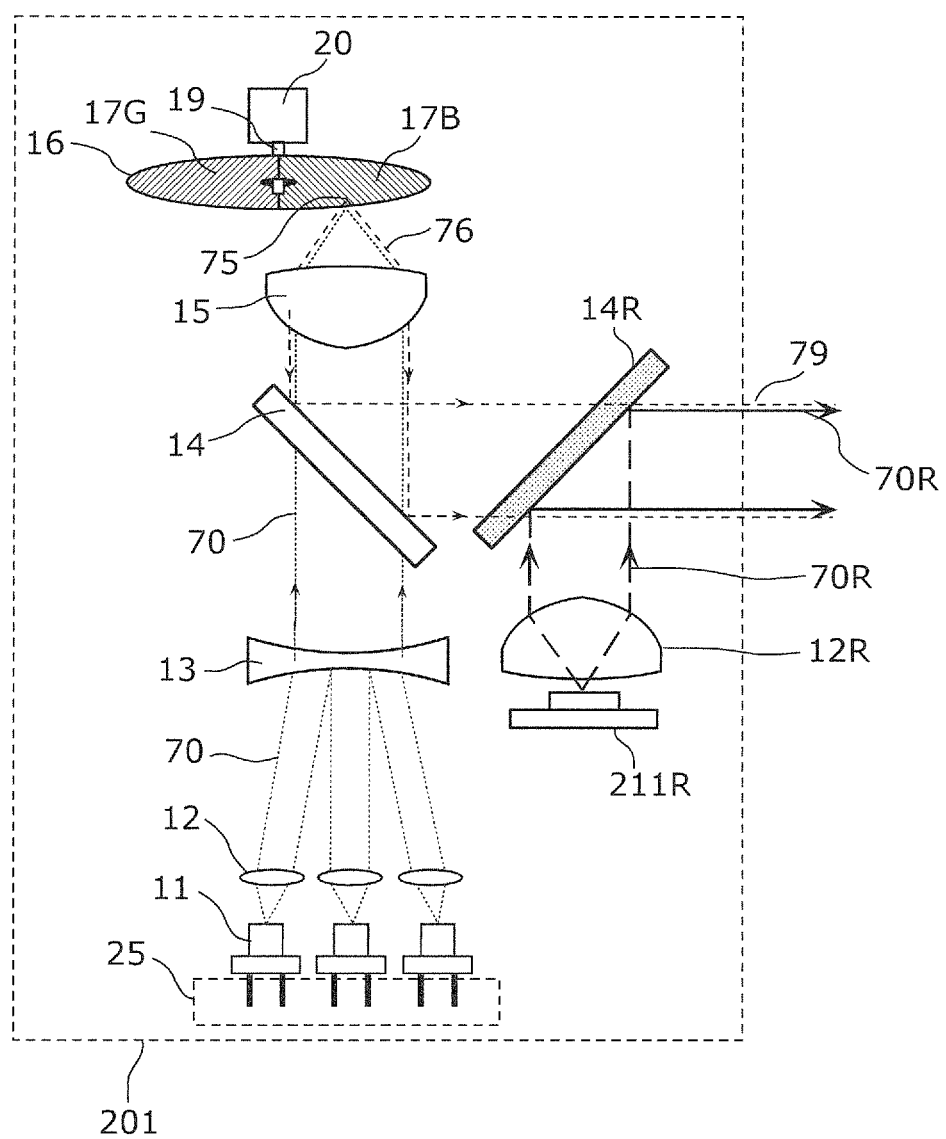

FIG. 13 illustrates a structure of a light-emitting device according to Variation of Embodiment 3.

Figure 14:
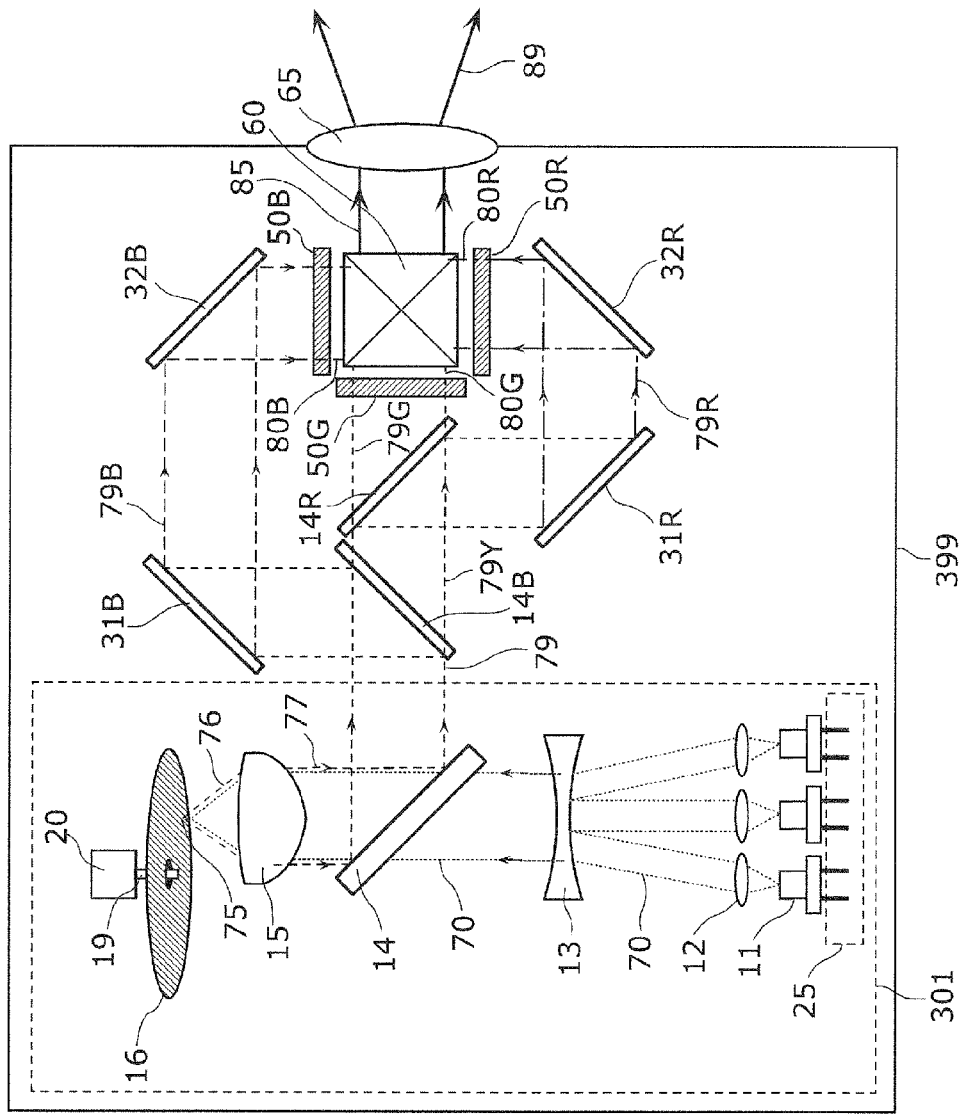

FIG. 14 illustrates structures of a light-emitting device and a projection apparatus according to Embodiment 4.

Figure 15:
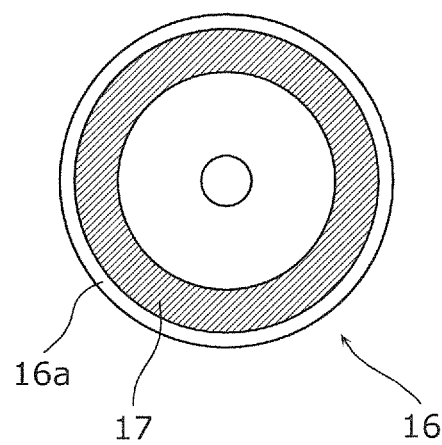

FIG. 15 illustrates a structure of a wavelength conversion unit in the light-emitting device according to Embodiment 4.

Figure 16:
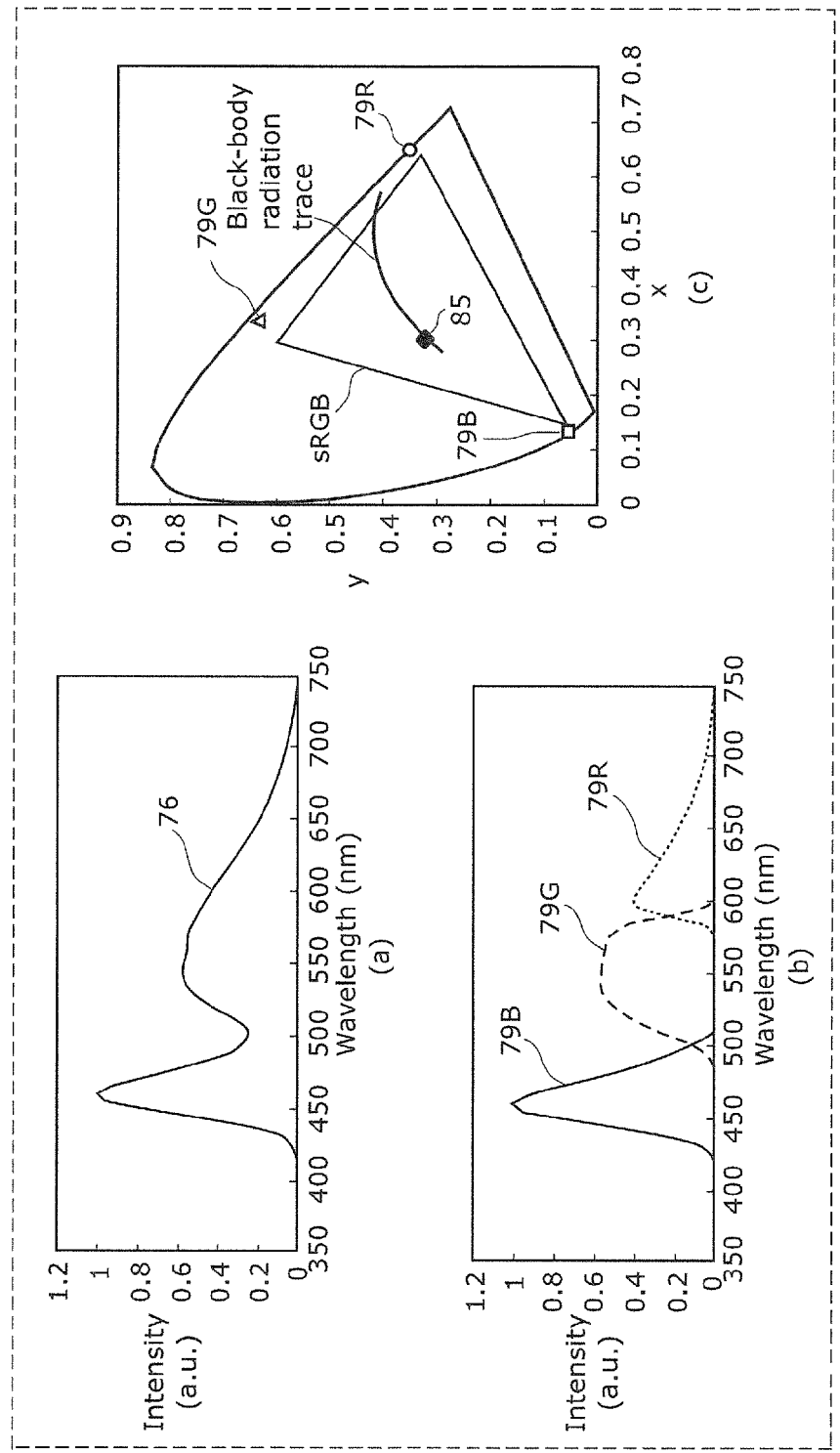

(a) of FIG. 16 illustrates a spectrum of wavelength-converted diffusion light according to Embodiment 4, (b) of FIG. 16 illustrates spectra of emitted light from the light-emitting device according to Embodiment 4, and (c) of FIG. 16 illustrates chromaticity coordinates of emitted light from the light-emitting device according to Embodiment 4.

Figure 17:
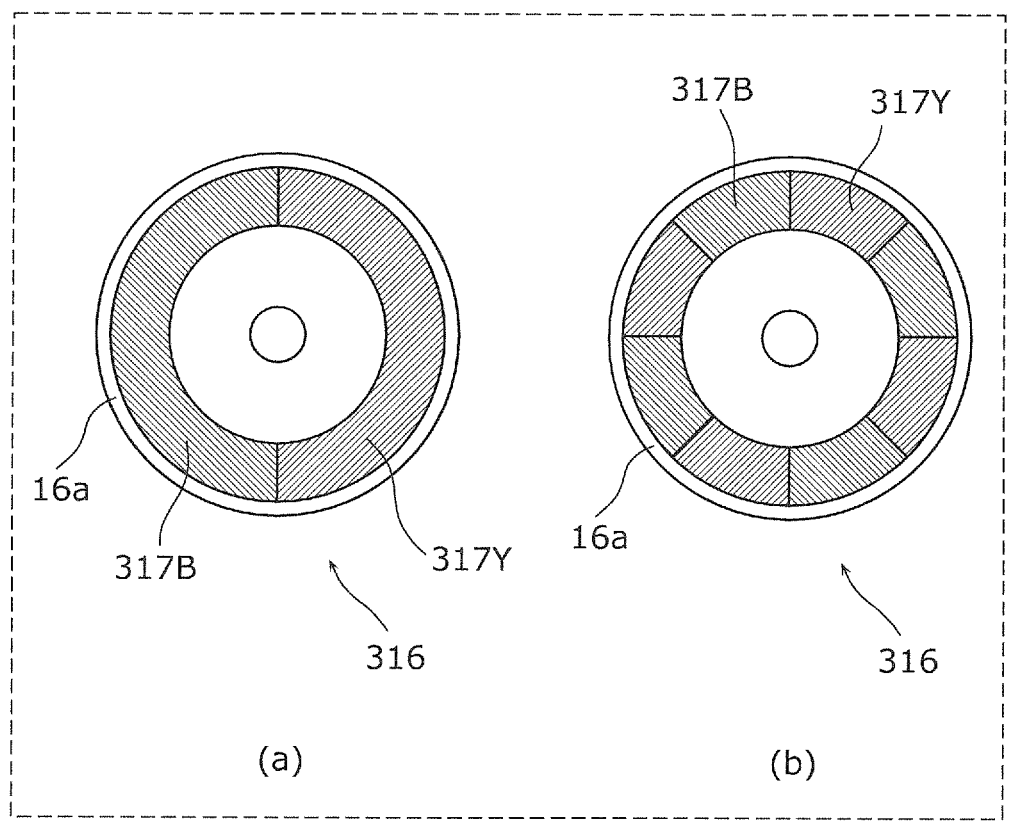

(a) of FIG. 17 illustrates a structure of a wavelength conversion unit according to a first example in the light-emitting device according to Embodiment 4, and (b) of FIG. 17 illustrates a structure of a wavelength conversion unit according to a second example used in the light-emitting device according to Embodiment 4.

Figure 18:
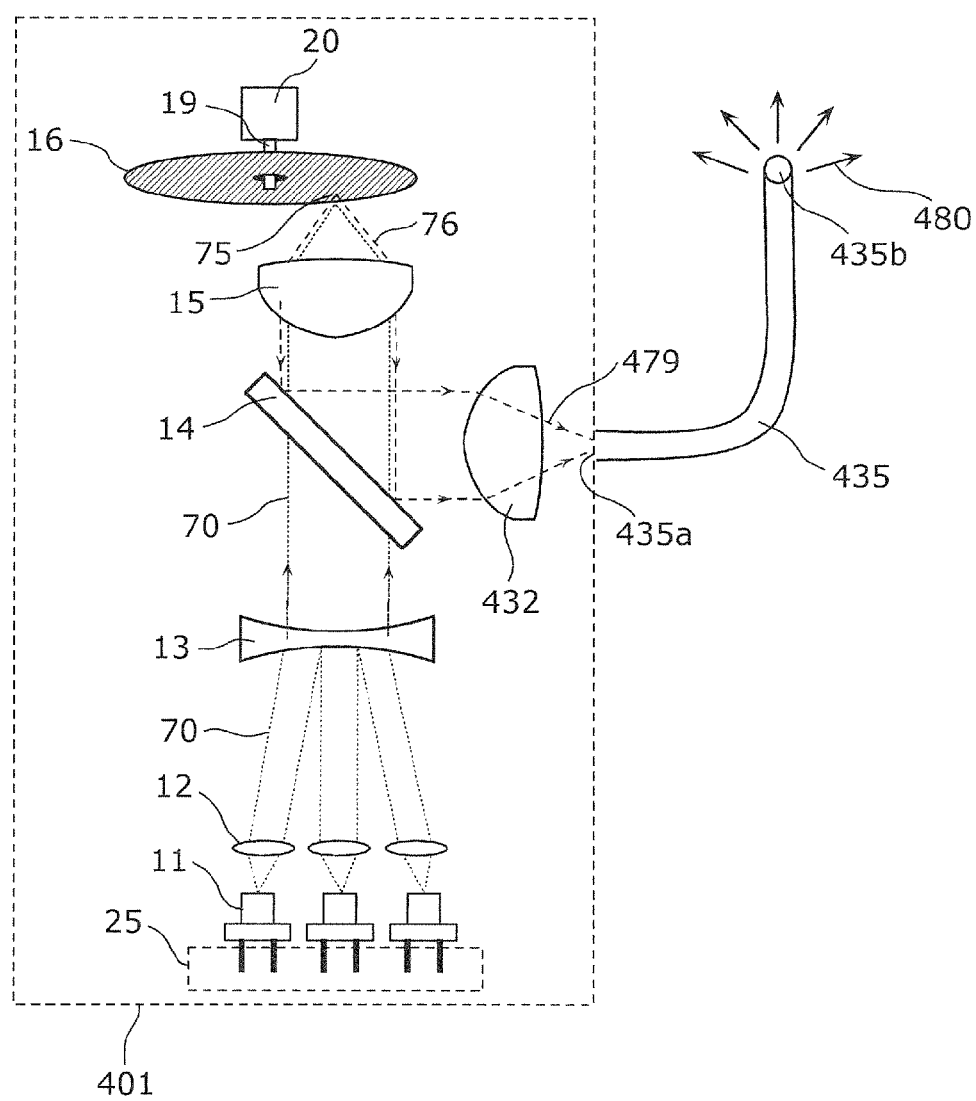

FIG. 18 illustrates a structure of a light-emitting device according to Variation of Embodiment 4.

Figure 19:
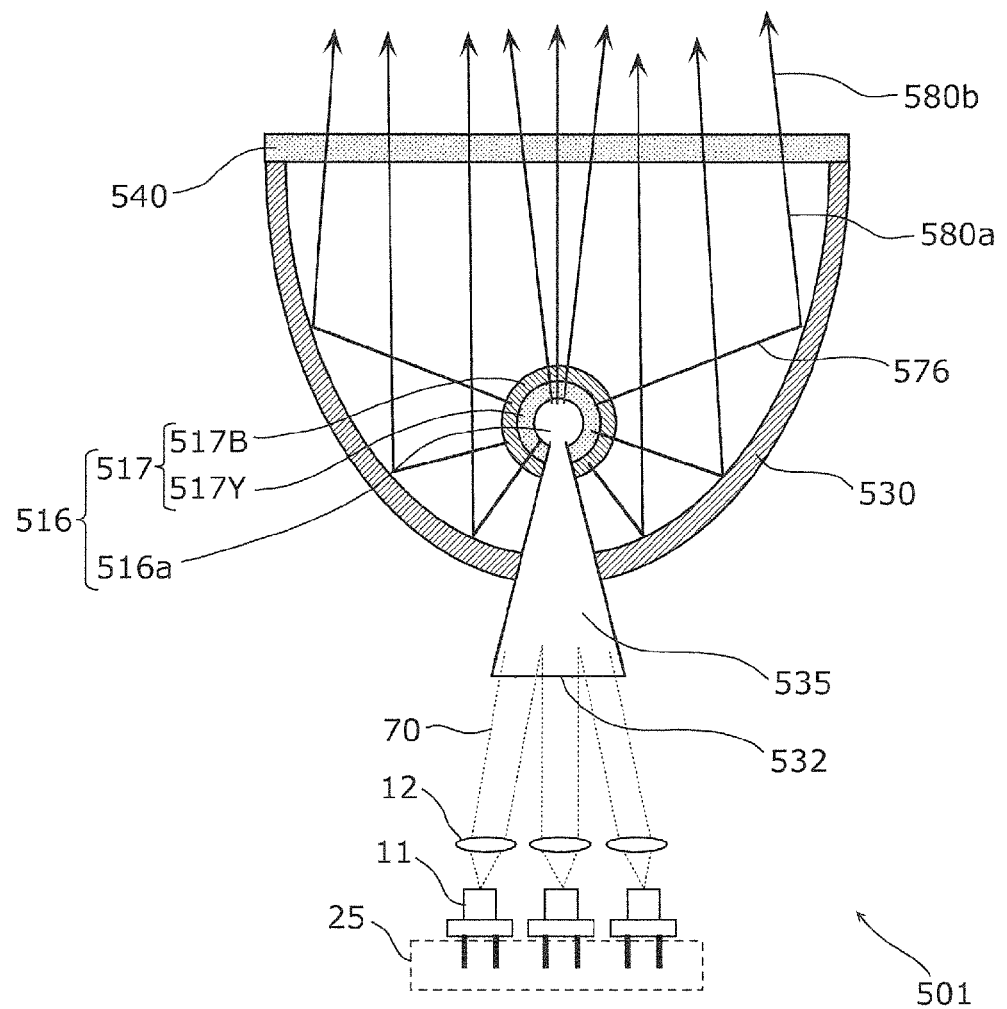

FIG. 19 illustrates a structure of a light-emitting device according to Embodiment 5.

Figure 20:
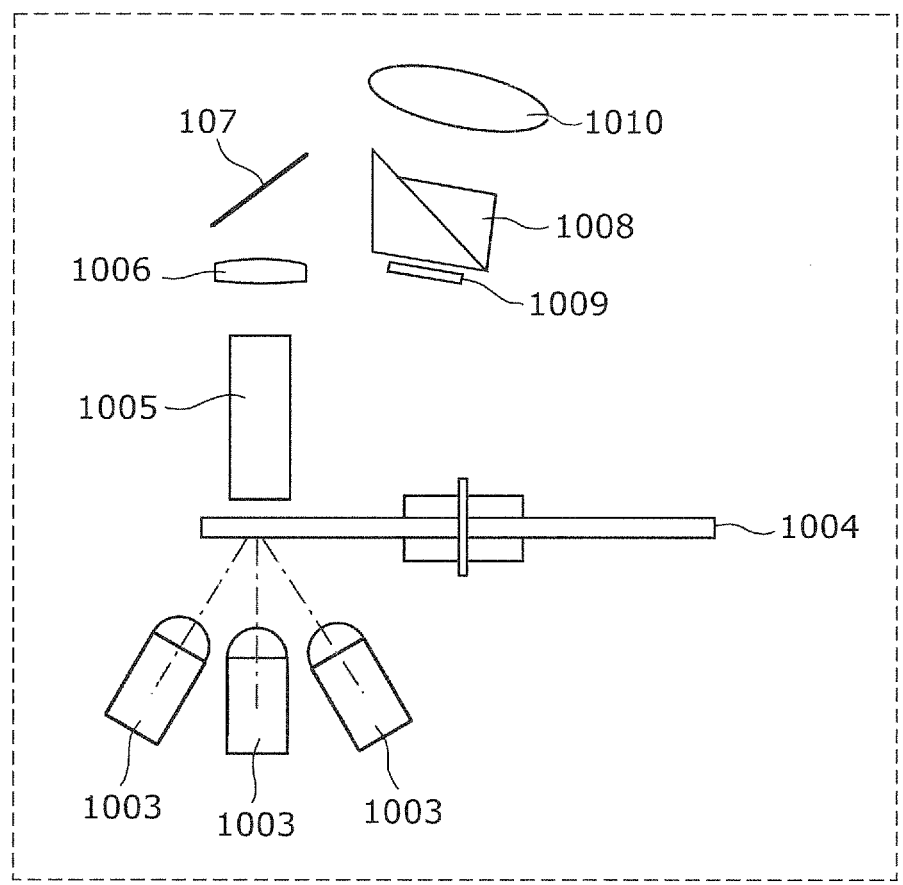

FIG. 20 illustrates a structure of a conventional light-emitting device.

DESCRIPTION OF EMBODIMENTS

Hereinafter, descriptions are given of a light-emitting device and a projection apparatus according to the present disclosure based on embodiments. It is to be noted that the embodiments described below show a specific example. The numerical values, shapes, materials, structural elements, the arrangement and connection of the structural elements etc. shown in the following embodiments are a mere example, and therefore do not limit the present disclosure. Among the structural elements in the embodiments below, structural elements not recited in any one of the independent claims defining the most generic part of the inventive concept are described as arbitrary structural elements.

It should be noted that the Drawings are schematic drawings, and are not necessarily exact depictions. Moreover, in the Drawings, elements having the substantially same configuration share the same reference numerals.

Embodiment 1

Hereinafter, descriptions are given of a light-emitting device and a projection apparatus according to Embodiment 1, referring to FIGS. 1 to 7.

Figure 1:
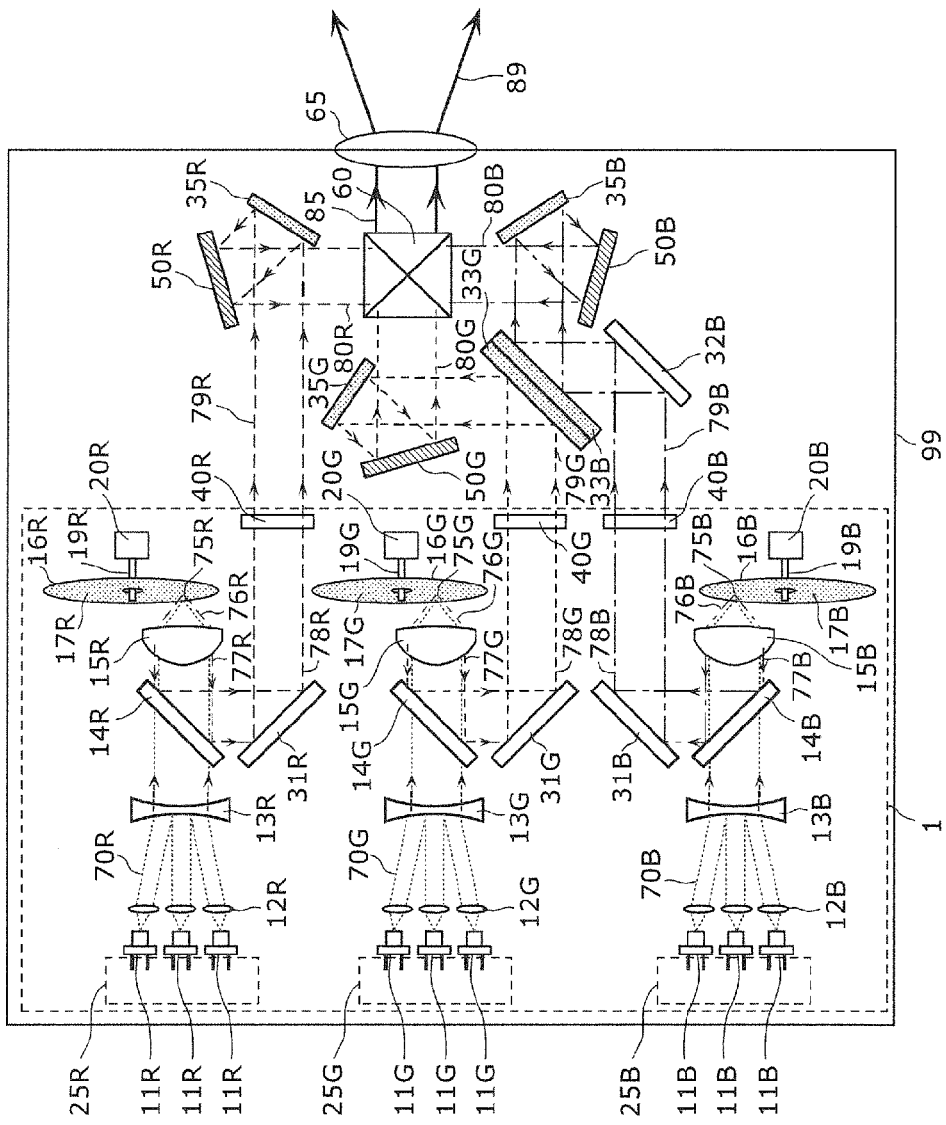
FIG. 1 illustrates structures of a light-emitting device and a projection apparatus including the light-emitting device according to Embodiment 1.

FIG. 1 illustrates a structure of a light-emitting device and a projection apparatus according to Embodiment 1.

As FIG. 1 illustrates, a projection apparatus 99 according to Embodiment 1 mainly includes a light-emitting device 1, image display elements 50B, 50G, and 50R, a dichroic prism 60, and a projector lens 65.

The light-emitting device 1 emits light of three primary colors which are: wavelength-converted light 79R with a main emission wavelength ranging from 580 nm to 660 nm, that is, red light; wavelength-converted light 79G with a main emission wavelength ranging from 500 nm to 580 nm, that is, green light; and wavelength-converted light 79B with a main emission wavelength ranging from 430 nm to 500 nm, that is, blue light.

The light-emitting device 1 includes three kinds of optical blocks each emitting light of a different color of the three primary colors. Specifically, the light-emitting device 1 includes a first optical block which emits blue light, a second optical block which emits green light, and a third optical block which emits red light. These optical blocks have substantially the same structure.

The first optical block which emits the wavelength-converted light 79B that is blue light includes a heat sink 25B and a plurality of (for example, 25) semiconductor light-emitting elements 11B on the heat sink 25B (three semiconductor light-emitting elements 11B are illustrated in FIG. 1). Each of the semiconductor light-emitting elements 11B is a semiconductor laser, for example, whose light output is 2 watt and center emission wavelength (peak wavelength) ranges from 400 nm to 430 nm (for example, wavelength of 410 nm).

Emitted light 70B from the semiconductor light-emitting elements 11B is collected to a concave lens 13B by collimator lenses 12B, and is caused to travel straight. Then, the light passes through a dichroic mirror 14B and is focused by a condenser lens 15B at a predetermined position on a phosphor layer 17B of a wavelength conversion unit 16B. Here, it is set such that light of, for example, 50 W is focused on the area of 1 mm$^2$ of a focused portion 75B that is a position at which light is focused.

The wavelength conversion unit 16B includes a disk-shaped metal plate, and the phosphor layer 17B formed over the surface of the metal plate. The wavelength conversion unit 16B includes a rotating shaft 19B and is rotated by a rotating mechanism 20B. The wavelength conversion unit 16B is rotated by the rotating mechanism 20B during the operation of the light-emitting device 1. The rotation prevents the emitted light 70B from being continuously emitted to a certain position on the phosphor layer 17B. The emitted light 70B focused onto the phosphor layer 17B is reflected after being wavelength-converted by a phosphor included in the phosphor layer 17B so that light with a center wavelength ranging from 400 nm to 430 nm is converted to light with a main wavelength ranging from 430 nm to 500 nm. In other words, the phosphor layer 17B provides fluorescent emission with the emitted light 70B as excitation light. The wavelength-converted light that has been reflected is wavelength-converted diffusion light 76B that is, so-called, of Lambertian type. The wavelength-converted diffusion light 76B is converted by the condenser lens 15B to wavelength-converted light 77B traveling straight again, is reflected off the dichroic mirror 14B and a reflective mirror 31B, and passes through a wavelength cutoff filter 40B as wavelength-converted light 78B. When passing through the wavelength cutoff filter 40B, unnecessary wavelengths of the wavelength-converted light 78B are cut off, thereby turning into the wavelength-converted light 79B (blue light) having a higher color purity. Then the wavelength-converted light 79B is emitted from the light-emitting device 1.

The second optical block and the third optical block have a similar structure as that of the first optical block. The second optical block emits the wavelength-converted light 79G that is green light, and the third optical block emits the wavelength-converted light 79R that is red light.

Specifically, the second optical block which emits the wavelength-converted light 79G that is green light includes a heat sink 25G and a plurality of semiconductor light-emitting elements 11G on the heat sink 25G. Emitted light 70G from the semiconductor light-emitting elements 11G is collected to a concave lens 13G by collimator lenses 12G, and is caused to travel straight. Then, the light passes through a dichroic mirror 14G and is focused by a condenser lens 15G at a predetermined position on a phosphor layer 17G of a wavelength conversion unit 16G. Here, it is set such that light of, for example, 50 W is collected to the area of 1 mm$^2$ of a focused portion 75G that is a position at which light is focused.

The wavelength conversion unit 16G includes a disk-shaped metal plate, and the phosphor layer 17G formed over the surface of the metal plate. The wavelength conversion unit 16G includes a rotating shaft 19G, is rotated by a rotating mechanism 20G, and operates in a similar manner to the wavelength conversion unit 16B.

The emitted light 70G focused onto the phosphor layer 17G is wavelength-converted by a phosphor included in the phosphor layer 17G, thereby turning into wavelength-converted diffusion light 76G. The wavelength-converted diffusion light 76G is converted by the condenser lens 15G to wavelength-converted light 77G traveling straight again, is reflected off the dichroic mirror 14G and a reflective mirror 31G, and passes through a wavelength cutoff filter 40G as wavelength-converted light 78G. Then the wavelength-converted light 78G is emitted from the light-emitting device 1 as the wavelength-converted light 79G (green light).

In a similar manner, the third optical block which emits the wavelength-converted light 79R that is red light includes a heat sink 25R and a plurality of semiconductor light-emitting elements 11R on the heat sink 25R. Emitted light 70R from the semiconductor light-emitting elements 11R is collected by collimator lenses 12R to a concave lens 13R, and is caused to travel straight. Then, the light passes through a dichroic mirror 14R and is focused at a predetermined position on a phosphor layer 17R of a wavelength conversion unit 16R through a condenser lens 15R. Here, it is set such that light of, for example, 50 W is focused to the area of 1 mm$^2$ of a focused portion 75R that is a position at which light is focused.

The wavelength conversion unit 16R includes a disk-shaped metal plate, and the phosphor layer 17R formed over the surface of the metal plate. The wavelength conversion unit 16R includes a rotating shaft 19R, is rotated by a rotating mechanism 20R, and operates in a similar manner to the wavelength conversion unit 16B.

The emitted light 70R focused onto the phosphor layer 17R is wavelength-converted by a phosphor included in the phosphor layer 17R, thereby turning into wavelength-converted diffusion light 76R. The wavelength-converted diffusion light 76R is converted by the condenser lens 15R to wavelength-converted light 77R traveling straight again, is reflected off the dichroic mirror 14R and a reflective mirror 31R, passes through a wavelength cutoff filter 40R as wavelength-converted light 78R, and is emitted from the light-emitting device 1 as the wavelength-converted light 79R (red light).

In order to facilitate color adjustment of the light-emitting device 1, the semiconductor light-emitting elements 11B, 11G, and 11R in the respective blocks have the same properties.

In the above structure, light output from the semiconductor light-emitting elements 11B, 11G, and 11R to the focused portions 75B, 75G, and 75R of the phosphor layers 17B, 17G, and 17R is 10 W or greater, preferably 50 W. Moreover, the focused area of the focused portions 75B, 75G, and 75R is set to 1 mm$^2$ or less, that is, set such that light density is 1 kW/cm$^2$ or greater, preferably 5 kW/cm$^2$. This is due to the following reasons. As described earlier, the wavelength-converted diffusion light 76B, 76G, and 76R respectively converted by the phosphor layers 17B, 17G, and 17R have a large spread angle. In order to convert the wavelength-converted diffusion light 76B, 76G, and 76R into light traveling straight (the wavelength-converted light 77B, 77G, and 77R) with the condenser lenses 15B, 15G, 15R, respectively, the emission areas may be as small as possible (Etendue that is obtained by spread angle× emission area may be as small as possible).

Next, a description is given of an operation of the projection apparatus 99 which includes the light-emitting device 1.

The wavelength-converted light 79B, 79G, and 79R emitted from the light-emitting device 1 is respectively directed to image display elements 50B, 50G, and 50R that are, for example, digital mirror devices (DMDs) by reflective mirrors 32B, 33B, 35B, 33G, 35G, and 35R. The light emitted to the image display elements 50B, 50G, and 50R is reflected off the image display elements 50B, 50G, and 50R after being respectively converted into signal light 80B, 80G and 80R on which two dimensional video signals are superimposed. The signal light 80B, 80G, and 80R is multiplexed by the dichroic prism 60 and converted into combined light 85. Then, the combined light 85 is emitted from the projection apparatus 99 as video light 89 that can be projected to a predetermined screen (not illustrated) by the projector lens 65.

Next, a description is given of an embodiment of properties of the phosphors included in the respective wavelength conversion units of the light-emitting device 1.

In the above described light-emitting device 1, the light density at the focused portions 75B, 75G, and 75R is 1 kW/cm² or greater. When light density is such high as in the above case, for example, it is configured such that change in color balance (color deviation) of the red, green, and blue wavelength-converted light 79R, 79G, and 79B is sufficiently small relative to variation in light output of the semiconductor light-emitting elements 11B, 11G, and 11R. In order to achieve the above configuration, for example, the phosphor layers 17R, 17G, and 17B of the wavelength conversion unit 16B (first wavelength conversion unit), the wavelength conversion unit 16G (second wavelength conversion unit), and the wavelength conversion unit 16R (third wavelength conversion unit) respectively comprise materials in which ratios of $\eta B_1$ to $\eta B_2$, $\eta G_1$ to $\eta G_2$, and $\eta R_1$ to $\eta R_2$ (that is, $\eta B_2/\eta B_1$, $\eta G_2/\eta G_1$, and $\eta R_2/\eta R_1$) satisfy the conditions below. Here, $\eta B_1$, $\eta G_1$, and $\eta R_1$ are light output ratio (energy conversion efficiency) obtained when light from the semiconductor light-emitting elements 11B, 11G, and 11R is emitted to the respective phosphors at a light density of 5 kW/cm². $\eta B_2$, $\eta G_2$, and $\eta R_2$ are light output ratio (energy conversion efficiency) obtained when light is emitted to the respective phosphors at a light density of 2.5 kW/cm².

$$1 \leq \eta B_2/\eta B_1 (=\eta B_2(P=0.5P_0)/\eta B_1(P=P_0)) \leq 1.09$$

$$1 \leq \eta G_2/\eta G_1 (=\eta G_2(P=0.5P_0)/\eta G_1(P=P_0)) \leq 1.09$$

$$1 \leq \eta R_2/\eta R_1 (=\eta R_2(P=0.5P_0)/\eta R_1(P=P_0)) \leq 1.09$$

Here, $\eta X_1$ (P=$P_0$) is energy conversion efficiency of a phosphor (=energy of wavelength-converted light emitted from the phosphor/energy of light incident on the phosphor) obtained when light density P of light emitted from the semiconductor light-emitting elements 11 to the phosphor layer (phosphor) is $P_0$=5 kW/cm² that is a reference light density at initial operation. $\eta X_2$ (P=0.5 $P_0$) is energy conversion efficiency of a phosphor obtained when the light density P of light emitted from the semiconductor light-emitting elements 11 to the phosphor layer (phosphor) is decreased from the initial operation sate by 50% to 2.5 W/cm², that is, when P=0.5 $P_0$. Note that in "$\eta X$", X is B, G, or R. Moreover, in the following descriptions, $\eta X_2/\eta X_1$ is referred to as "efficiency variation coefficient".

Next, a description is given of specific phosphor materials included in each phosphor layer and satisfying the above conditions.

First, the phosphor of the phosphor layer 17B (first phosphor) has, for example, a peak fluorescence wavelength, which is a fluorescence-spectral peak wavelength, ranging from 430 nm to 500 nm. The phosphor of the phosphor layer 17B according to Embodiment 1 is a phosphor containing at least Sr, silicate, and Eu as an activator, and is a phosphor mainly containing, for example, an Eu-activated $Sr_3MgSi_2O_8$ phosphor.

The phosphor of the phosphor layer 17G (second phosphor) has, for example, a peak fluorescence wavelength ranging from 500 nm to 660 nm. The phosphor of the phosphor layer 17G according to Embodiment 1 is a Ce-activated aluminate phosphor, and is a phosphor mainly containing, for example, a Ce-activated $Y_3(Al,Ga)_5O_{12}$ phosphor.

The phosphor of the phosphor layer 17R (third phosphor) has, for example, a peak fluorescence wavelength ranging from 520 nm to 660 nm. The phosphor of the phosphor layer 17R according to Embodiment 1 is a Ce-activated aluminate phosphor, and is a phosphor mainly containing, for example, a Ce-activated $(Y,Gd)_3(Al,Ga)_5O_{12}$ phosphor.

Next, referring to FIG. 2, a description is given of an operation of the light-emitting device 1 including such phosphors.

In FIG. 2, (a) illustrates spectra of the wavelength-converted light 78B, 78G, and 78R when an Eu-activated $Sr_3MgSi_2O_8$ phosphor, a Ce-activated $Y_3(Al,Ga)_5O_{12}$ phosphor, and a Ce-activated $Y_3Al_5O_{12}$ phosphor are used as phosphors respectively included in the wavelength conversion units 16B, 16G, and 16R.

As described above, unnecessary wavelengths of the wavelength-converted light 78B, 78G, and 78R are respectively cut off by the wavelength cutoff filters 40B, 40G, and 40R. Hence, as (b) of FIG. 2 illustrates, the wavelength-converted light 78B, 78G, and 78R is respectively converted to the wavelength-converted light 79B, 79G, and 79R having spectra with increased color purity, and is emitted from the light-emitting device 1. Here, it is set such that the wavelength cutoff filter 40B cuts off light of a wavelength of 500 nm or greater, the wavelength cutoff filter 40G cuts off light of a wavelength of 610 nm or greater, and the wavelength cutoff filter 40R cuts off light of a wavelength of 580 nm or less.

As the chromaticity coordinates in (d) of FIG. 2 illustrates, the wavelength-converted light 79B, 79G, and 79R are blue light, green light, and red light, respectively. Moreover, (c) of FIG. 2 illustrates the spectrum of the combined light 85 obtained by multiplexing the wavelength-converted light 79B, 79G, and 79R. Moreover, (d) of FIG. 2 illustrates the chromaticity coordinates of the combined light 85. It is set such that the x and y values of color coordinates (x, y) of the combined light 85 are (0.306, 0.315) and the color temperature is about 7000 K that is white light.

Next, referring to FIG. 3, a description is given of the effects of the light-emitting device 1 and the projection apparatus 99 according to Embodiment 1, using simulation data and experimental data.

First, referring to (a) and (b) of FIG. 3, a description is given of measurement results of excitation light density dependency of energy conversion efficiency of conventional light-emitting devices including combinations of phosphors.

In FIG. 3, (a) illustrates excitation light density dependency of a light-emitting device according to conventional structure (1), and illustrates energy conversion efficiency of phosphors in the light-emitting device including a light source that is a semiconductor laser having an emission center wavelength of about 410 nm. (a) of FIG. 3 illustrates measurement results obtained when a blue phosphor that is, an Eu-activated $(Ba,Mg)Al_{10}O_{17}$ phosphor (hereinafter referred to as BAM-1), and a green phosphor that is an Eu-activated $(Sr,Ba)_2SiO_4$ phosphor (hereinafter, referred to as SBSE-1) which are used for a white LED are used as phosphors.

As (a) of FIG. 3 illustrates, the energy conversion efficiency of the blue phosphor and the green phosphor decreases as the excitation light density increases. In particular, the energy conversion efficiency of the green phosphor rapidly decreases. As a result, variation in difference in energy conversion efficiency between these two phosphors increases, thereby increasing the difference in values of efficiency variation coefficients $\eta B_2/\eta B_1$ and $\eta G_2/\eta G_1$. For example, when the light output of the semiconductor light-emitting element 11 decreases by 50% from 5 kW/cm² that is at the initial operation to 2.5 kW/cm², the light-emitting device 1 significantly loses the color balance.

In FIG. 3, (b) illustrates excitation light density dependency of a light-emitting device according to conventional structure (2), and illustrates energy conversion efficiency of phosphors in the light-emitting device including a light source that is a blue semiconductor laser having an emission center wavelength of about 450 nm. (b) of FIG. 3 illustrates evaluation results of a Ce-activated $Y_3(Al,Ga)_5O_{12}$ phosphor (hereinafter referred to as YAGG-1) disclosed in PTL 4, and a Ce-activated $Y_3Al_5O_{12}$ phosphor (hereinafter referred to as YAG-1) that is a general YAG phosphor as comparison.

As (b) of FIG. 3 illustrates, YAG-1 as a phosphor has a small excitation light density dependency of energy conversion efficiency. This phosphor, however, emits light in a so-called yellow range; and thus, the phosphor is unlikely to be used as a green phosphor for display applications. Moreover, as (b) of FIG. 3 illustrates, YAGG-1 as a phosphor has an excitation light density dependency of energy conversion efficiency greater than that of YAG-1. Here, emitted light from the semiconductor light-emitting elements is directly used as blue light used for forming white light. In this case, the optical efficiency of blue light is determined to be a constant rate without depending on the excitation light density. Hence, when the blue light from the semiconductor light-emitting elements is used in combination with the green light from the YAGG-1 phosphor, the effect of efficiency variation coefficient $\eta G_2/\eta G_1$ increases with an increase in the amount of decrease in light output of the semiconductor light-emitting elements, resulting in an increase in color deviation of white light.

(c) of FIG. 3 illustrates excitation light density dependency of a light-emitting device according to Embodiment 1, and illustrates evaluation results obtained when phosphors of the phosphor layers illustrated in FIG. 1 are used. Here, in (c) of FIG. 3, a semiconductor laser with an emission center wavelength of about 410 nm is used as an excitation light source, and Eu-activated $Sr_3MgSi_2O_8$ (hereinafter referred to as SMS-1) that is a phosphor included in the phosphor layer 17B and Ce-activated $Y_3(Al,Ga)_5O_{12}$ (YAGG-1) that is a phosphor included in the phosphor layer 17G are used as phosphors. Specifically, the Eu-activated $Sr_3MgSi_2O_8$ (SMS-1) used has an Eu concentration of 1 mol %, has a dispersion of particles each having a size ranging from 2 μm to 20 μm (mean particle size is 8 μm).

As (c) of FIG. 3 illustrates, in Embodiment 1, when the phosphor is Eu-activated $Sr_3MgSi_2O_8$ (SMS-1), change in energy conversion efficiency is small even when excitation light density changes. In other words, it is understood that the SMS-1 phosphor has a small excitation light density dependency. Furthermore, when Ce-activated $Y_3(Al,Ga)_5O_{12}$ (YAGG-1) is used as a phosphor, change in energy conversion efficiency is also small. In other words, it is understood that the YAGG-1 phosphor also has a small excitation light density dependency. As a result, it is understood that the difference in amount of change in energy conversion efficiency between Eu-activated $Sr_3MgSi_2O_8$ and Ce-activated $Y_3(Al,Ga)_5O_{12}$ is very small. In other words, it is possible to reduce not only the efficiency variation coefficient $\eta B_2/\eta B_1$ of the phosphor (SMS-1) of the phosphor layer 17B, but also the difference $(\eta B_2/\eta B_1 - \eta G_2/\eta G_1)$ which is the difference between the efficiency variation coefficient $\eta B_2/\eta B_1$ of the SMS-1 and the efficiency variation coefficient $G_2/G_1$ of the phosphor (YAGG-1) of the phosphor layer 17G.

As described, light saturation of the phosphor layer 17B can be reduced by using Eu-activated $Sr_3MgSi_2O_8$ as a phosphor included in the phosphor layer 17B which emits blue light and a semiconductor laser having an emission wavelength ranging from 400 nm to 430 nm as the semiconductor light-emitting element 11B serving as an excitation light source. When the excitation light density of the excitation light source changes, it is possible to reduce variation in difference in energy conversion efficiency between Eu-activated $Sr_3MgSi_2O_8$ and phosphors used in combination with Eu-activated $Sr_3MgSi_2O_8$. As a result, color deviation of light emitted from a light-emitting device can be reduced, enhancing color reproducibility of the emission spectrum of the light-emitting device.

Moreover, when one type of semiconductor light-emitting element having an emission wavelength ranging from 400 nm to 430 nm is used and an Eu-activated $Sr_3MgSi_2O_8$ phosphor is used as a phosphor which emits blue light, a Ce-activated $Y_3(Al,Ga)_5O_{12}$ phosphor may be used as a phosphor which emits green light.

The reason why the Eu-activated $Sr_3MgSi_2O_8$ phosphor included in the phosphor layer 17B in Embodiment 1 has an efficiency variation coefficient less than that of the Eu-activated $BaMgAl_{10}O_{17}$ phosphor which is also an Eu-activated phosphor is considered as follows.

First, Eu-activated $Sr_3MgSi_2O_8$ has a merwinite structure that is a dense crystal structure and is obtained by replacing part of Sr that is a constituent element with Eu serving as an activator. On the other hand, the Eu-activated $BaMgAl_{10}O_{17}$ phosphor which is conventionally used has a stack structure of spinel crystals and is obtained by replacing part of Ba with Eu serving as an activator.

Here, a description is given focusing on the atomic distance between Eu serving as an activator and the base crystal. The distance between Eu and the base crystal in the Eu-activated $Sr_3MgSi_2O_8$ phosphor is about 2 Å, and is less than that (about 3 Å) in the Eu-activated $BaMgAl_{10}O_{17}$ phosphor. Accordingly, the energy level of the Eu ion in the Eu-activated $Sr_3MgSi_2O_8$ phosphor has a high-vibration level. The amount of increase in non-emission transition ratio of the Eu-activated $Sr_3MgSi_2O_8$ phosphor when the intensity of excitation light is high is less than that of the Eu-activated $BaMgAl_{10}O_{17}$ phosphor.

It is inferred that the above fact makes the efficiency variation coefficient of the Eu-activated $Sr_3MgSi_2O_8$ phosphor less than that of the Eu-activated $BaMgAl_{10}O_{17}$ phosphor. Furthermore, it is understood that the same effect would occur also in the case where part or all of Sr in the Eu-activated $Sr_3MgSi_2O_8$ phosphor is replaced with Ca or Ba.

Next, referring to FIG. 4, a description is given of the effects given by the excitation light density dependency of energy conversion efficiency of the phosphors described above to the color balance of emitted light from the light-emitting device. FIG. 4 is a plot of comparison of color deviation of white light emitted from the light-emitting devices, using the chromaticity coordinates. The comparison is between the case where light output from the semiconductor light-emitting elements is decreased from the initial operation ($P=P_0$:5 kW/cm²) to ($P=0.75 P_0$:3.75 kW/cm²) by 25% and to ($P=0.5 P_0$:2.5 kW/cm²) by 50%. In FIG. 4, it is set such that the chromaticity coordinates of white light at initial operation indicate values for 7000 K for each of the light-emitting devices according to Embodiment 1, conventional structures (1) and (2). Here, evaluation was made in each of the light-emitting devices according to Embodiment 1, and conventional structures (1) and (2) which include Ce-activated $Y_3Al_5O_{12}$(YAG-1) as a red phosphor.

First, in the comparison, it was designed such that x and y values of the chromaticity coordinates of white light at initial operation (reference chromaticity coordinates) are (0.306, 0.315). Here, with the structure according to Embodiment 1, when the light output of the semiconductor light-emitting elements is decreased from the initial operation by 25% ($P=0.75\ P_0$), the deviation from the reference chromaticity coordinates is (0.0006, 0.0009). When the light output is decreased from the initial operation by 50% ($P=0.5\ P_0$), the deviation from the reference chromaticity coordinates is (−0.0004, 0.0043). It is understood that the amount of deviation of each of x and y coordinates from the reference color coordinates is less than 0.01, which is significantly small.

On the other hand, with conventional structure (1), when the light output is decreased from the initial operation by 25% ($P=0.75\ P_0$), the chromaticity coordinates are (0.312, 0.379), and when the light output is decreased by 50% ($P=0.5\ P_0$), the chromaticity coordinates are (0.312, 0.401).

Moreover, with conventional structure (2), when the light output is decreased from the initial operation by 25% ($P=0.75\ P_0$), the chromaticity coordinates are (0.312, 0.346), and when the light output is decreased by 50% ($P=0.5\ P_0$), the chromaticity coordinates are (0.310, 0.337).

In this way, it is understood that in both of conventional structures (1) and (2), at least one of the x-coordinate and the y-coordinate deviates from the reference chromaticity coordinates by greater than 1/100, resulting in reduced color reproducibility.

Next, in order to clarify the relationship between the efficiency variation coefficient $\eta X_2/\eta X_1$ and the amount of color deviation $|\Delta x|$ and $|\Delta y|$ of white light of the chromaticity coordinates more in detail, calculation was carried out using the emission spectra illustrated in (b) of FIG. 2. FIG. 5 illustrates results obtained by calculating the relationship between the efficiency variation coefficient $\eta X_2/\eta X_1$ and the amount of color deviation $|\Delta x|$ and $|\Delta y|$ of white light of the chromaticity coordinates.

From the result illustrated in FIG. 5, it is understood that the condition for efficiency variation coefficient of an Eu-activated $Sr_3MgSi_2O_8$ phosphor that can make the amount of color deviation of x-coordinate ($|\Delta x|$) and the y-coordinate ($|\Delta y|$) from the reference chromaticity coordinates 1/100 or less is $1 \leq \eta B_2/B_1 \leq 1.09$.

Next, in order to research the structure of an Eu-activated $Sr_3MgSi_2O_8$ phosphor which satisfies the above condition for the efficiency variation coefficient, evaluation was made on the excitation light density dependency of energy conversion efficiency of the Eu-activated $Sr_3MgSi_2O_8$ with different concentrations (mol concentration) of the activator (Eu). (a) of FIG. 6 illustrates results obtained when the Eu concentration was varied to 0.35%, 1%, 2%, and 3%. (b) of FIG. 6 is a plot of energy conversion efficiency obtained when Eu concentration is varied in the cases where the excitation light density is 1 W/cm² and 5 kW/cm².

Here, when a light-emitting device is used for white LED applications as in a conventional technique, the density of excitation light emitted to a phosphor is very low, which is about 1 W/cm². In this case, as (b) of FIG. 6 illustrates, the optimum value of the Eu concentration is around 2 mol %. On the other hand, as in Embodiment 1, in order to increase the energy conversion efficiency in the light-emitting device having a high excitation light density, as illustrated in (b) of FIG. 6, the Eu concentration may be lower than that when a light-emitting device is used for white LED applications, and, for example, 1 mol %.

The reasons why the optimal value differs depending on the excitation light density are inferred as follows. When the excitation light density is 1 W/cm², which is relatively low, most of non-emission transition such as lattice distortion or lattice vibration can be ignored even when the Eu concentration is high. Hence, the effects of concentration quenching reach the upper limit at the peak of the energy conversion efficiency. The upper limit is when the Eu concentration is about 2 mol %. On the other hand, when the excitation light density is relatively high, such as the case where excitation light is emitted to a phosphor in a projector light source or the like, the energy conversion efficiency reaches its peak when the Eu concentration is 1 mol %. As described, the reason why the optimal value of the Eu concentration differs depending on the magnitude of the excitation light density is considered to be that decrease in lattice distortion or decrease in lattice vibration at high Eu concentration cannot be ignored at an excitation light density where non-emission transition is high such as decrease in lattice distortion or decrease in lattice vibration.

Next, (c) of FIG. 6 is a plot of efficiency variation coefficient $\eta X_2/\eta X_1$ when Eu concentration is varied. As (c) of FIG. 6 illustrates, the efficiency variation coefficient $\eta B_2/\eta B_1$ can be reduced by reducing the Eu concentration compared to the conventional technique. As described above, however, excessive reduction in Eu concentration reduces the energy conversion efficiency as a whole. Hence, in order to keep the color deviation of white light less than 1/100 ($1 \leq \eta B_2/\eta B_1 \leq 1.09$) and increase the luminous efficacy of the phosphor layer when the excitation light density is significantly high, such as 1 kW/cm², the Eu concentration is preferably 2% or less, and more preferably 0.5 mol % or greater and 2 mol % or less.

Next, a description is given of embodiments of the phosphor material for the phosphor layer 17G. (a) of FIG. 7 illustrates the excitation light density dependency of energy conversion efficiency of a Ce-activated $Y_3(Al,Ga)_5O_{12}$ phosphor (YAGG-1 phosphor) used as the phosphor layer 17G. (a) of FIG. 7 illustrates comparison between the case where light with an emission center wavelength of about 450 nm and about 410 nm is used as excitation light.

As (a) of FIG. 7 illustrates, when light having an emission center wavelength of 450 nm is used, the excitation light density dependency of energy conversion efficiency is high, and the energy conversion efficiency varies relative to the excitation light density. In contrast, when light having an emission center wavelength of 410 nm is used, the excitation light density dependency of energy conversion efficiency is low, and the efficiency variation coefficient $\eta G_2/\eta G_1$ of energy conversion efficiency indicates a significantly small value that is $\eta G_2/\eta G_1=1.019$. Moreover, as to the Ce-activated $Y_3Al_5O_{12}$ phosphor used in the phosphor layer 17R, the efficiency variation coefficient $\eta R_2/\eta R_1$ of energy conversion efficiency is significantly low.

As described above, the reason why light saturation of the Ce-activated $Y_3(Al, Ga)_5O_{12}$ phosphor decreases with a decrease in wavelength is inferred to be followings. (b) of FIG. 7 illustrates energy levels of Ce ion of the Ce-activated $Y_3(Al, Ga)_5O_{12}$ phosphor. (c) of FIG. 7 illustrates the absorption spectrum of the Ce-activated $(Y,Gd)_3(Al, Ga)_5O_{12}$ phosphor.

As (b) of FIG. 7 illustrates, the Ce ion in the Ce-activated $Y_3(Al,Ga)_5O_{12}$ phosphor shows $4f\text{-}5d$ transition. When electrons are excited by excitation light from $^2F_{5/2}$ of orbital $4f$ to excited $5d$ level, and then return to two ground levels of $^2F_{5/2}$ and $^2F_{7/2}$ of the orbital $4f$, light of wavelength ranging from 510 nm to 580 nm is emitted. Here, by making the energy of the excitation light greater than the central energy of the excited level, excited level of higher energy can be used, so that saturation of excited level can be reduced. As a result, it is understood that light saturation is unlikely to occur.

Hence, as (c) of FIG. 7 illustrates, in the absorption spectrum of the Ce-activated $(Y,Gd)_3(Al,Ga)_5O_{12}$ phosphor, light of a wavelength less than the peak wavelength is used as excitation light. As a result, light saturation can be reduced. In particular, as in Embodiment 1, light of a wavelength ranging from 400 nm to 430 nm may be combined with a Ce-activated $Y_3(Al,Ga)_5O_{12}$ phosphor.

As described above, according to the light-emitting device 1 in Embodiment 1, phosphors for the phosphor layer 17B, the phosphor layer 17G, and the phosphor layer 17R respectively have efficiency variation coefficient of energy conversion efficiency $\eta B_2/\eta B_1$, $\eta G_2/\eta G_1$, and $\eta R_2/\eta R_1$ which satisfy the above conditions. By doing so, even when the light output of the semiconductor light-emitting elements decreases by half after a long period of use of the light-emitting device, for example, the color deviation of the chromaticity coordinates (0.306, 0.316) of white light can be made within (0.306±0.01, 0.316±0.01). Hence, it is possible to achieve a light-emitting device which emits light with high luminance and small color deviation. In other words, in a light-emitting device which converts light emitted from the semiconductor lasers and emits the converted light, it is possible to reduce light saturation of the phosphors and rapid decrease in energy conversion efficiency of the phosphors, and to easily adjust color balance. Additionally, a projection apparatus including such a light-emitting device can be provided.

In Embodiment 1, descriptions have been given of the light-emitting device and the projection apparatus for projector applications, but the present disclosure can be applied not only to the projectors, but also to displays, such as a rear projection television or a head-up display, or to light-emitting devices used as a light source, such as a projection light source for headlights, a light source for medical use for an endoscope or the like.

Embodiment 2

Next, referring to FIGS. 8, 9, and 10, a description is given of a light-emitting device according to Embodiment 2. In Embodiment 2, Eu-activated $BaMgAl_{10}O_{17}$ is used as a blue phosphor. Embodiment 2 describes that efficiency variation coefficient $\eta B_2/\eta B_1$ of energy conversion efficiency can be reduced also in the Eu-activated $BaMgAl_{10}O_{17}$ phosphor. Since the structure of a light-emitting device according to Embodiment 2 is similar to that of the light-emitting device 1 according to Embodiment 1, the description thereof is not given.

In Embodiment 2, Eu-activated $BaMgAl_{10}O_{17}$, Ce-activated $Y_3(Al,Ga)_5O_{12}$, and Ce-activated $Y_3Al_5O_{12}$ are respectively used as phosphors included in the wavelength conversion units 16B, 16G, and 16R. FIG. 8 illustrates the spectrum of wavelength-converted light 78B and the spectrum of combined light 85 of the wavelength-converted light 78B, 78G, and 78R according to Embodiment 2. The unnecessary wavelengths of the wavelength-converted light 78B, 78G, and 78R are cut off by the wavelength cutoff filters 40B, 40G, and 40R, respectively. Hence, the wavelength-converted light 78B, 78G, and 78G are emitted from the light-emitting device 1 as the wavelength-converted light 79B, 79G, and 79R having spectra with improved color purity (not illustrated). Here, in a similar manner to Embodiment 1, it is set such that the wavelength cutoff filter 40B cuts off light of a wavelength of 500 nm or greater, the wavelength cutoff filter 40G cuts off light of a wavelength of 610 nm or greater, and the wavelength cutoff filter 40R cuts off light of a wavelength of 580 nm or less. Moreover, it is set such that x and y values of the chromaticity coordinates of the combined light 85 is (0.306, 0.315), and the white light has a color temperature of about 7000 K.

Next, referring to FIG. 9, a description is given of a relationship between the value of efficiency variation coefficient $\eta B_2/\eta B_1$ and deviation in the chromaticity coordinates of the light-emitting device, in a similar manner to FIG. 5. FIG. 9 illustrates the relationship between the efficiency variation coefficient $\eta B_2/\eta B_1$ and the amount of color deviation $|\Delta x|$ and $|\Delta y|$ in the chromaticity coordinates of white light.

According to the result illustrated in FIG. 9, in Embodiment 2, in order to make each of the amount of color deviation in x-coordinate ($|\Delta x|$) and the amount of color deviation in y-coordinate ($|\Delta y|$) $\frac{1}{100}$ or less, efficiency variation coefficient $\eta B_2/\eta B_1$ needs to be 1.17 or less. In other words, as FIG. 9 illustrates, for example, the efficiency variation coefficient $\eta B_2/\eta B_1$ of a phosphor for blue light satisfies the following condition.

$$1 \leq \eta B_2/\eta B_1 (=\eta B_2(P=2.5kW/cm^2)/\eta B_1(P=5kW/cm^2)) \leq 1.17$$

(a) of FIG. 10 illustrates excitation light density dependency of energy conversion efficiency of an Eu-activated $BaMgAl_{10}O_{17}$ phosphor and Eu concentration dependency.

Here, as in the conventional light-emitting devices, when the excitation light density is 1 W/cm² or less, as PTL 7 discloses, luminous efficacy can be optimized by making the Eu concentration of the Eu-activated $BaMgAl_{10}O_{17}$ phosphor 20 mol % or greater. The inventors of the present application also confirmed that luminous efficiency was low when the Eu concentration was 20 mol % or less. However, in the case of the light-emitting device according to Embodiment 2 which includes the Eu-activated $BaMgAl_{10}O_{17}$ phosphor, the efficiency variation coefficient is high as described above. It is understood that this is due to long bond distance between Eu and the base material and long non-emission process due to lattice distortion or lattice vibration. Accordingly, in order to obtain an Eu-activated $BaMgAl_{10}O_{17}$ phosphor having small light saturation even when excitation light density is high, excitation light density dependency of energy conversion efficiency was compared with the Eu concentration varying between 7% and 53%.

As a result, as (b) of FIG. 10 illustrates, when the Eu concentration is 7 mol % or less and when the efficiency variation coefficient of the phosphor is $1 \leq \eta B_2/\eta B_1 (=\eta B_2 (P=2.5\ kW/cm^2)/\eta B_1 (P=5\ kW/cm^2)) \leq 1.17$, color deviation of the light-emitting device can be reduced. It is understood that this is because non-emission process due to lattice vibration is reduced by reducing the Eu concentration.

(b) of FIG. 10 also illustrates a plot of Eu dependency of energy conversion efficiency of the phosphor at an excitation light density of 6 kW/cm². Here, when the Eu concentration is low (for example, 7 mol %), the energy conversion efficiency at a low light density (for example, 1 kW/cm²) is less than that obtained when the Eu concentration is 20 mol % or greater. Since the efficiency variation coefficient is small, however, the energy conversion efficiency of the phosphor layer at an excitation light density (5 kW/cm² or greater) in actual use is sufficiently high. Hence, by including an Eu-activated $BaMgAl_{10}O_{17}$ phosphor with Eu concentration of 7 mol % or less in a light-emitting device, it is possible to obtain small color deviation even when light output of the semiconductor light-emitting elements of the light-emitting device changes, and high conversion efficiency of the phosphor layers.

When an Eu-activated $BaMgAl_{10}O_{17}$ phosphor with Eu concentration of 7 mol % or less, any green phosphors and red phosphors may be used in combination which have efficiency variation coefficients $\eta G_2/\eta G_1$ and $\eta R_2/\eta R_1$ respectively satisfying $1 \leq \eta G_2/\eta G_1 \leq 1.17$ and $1 \leq R_2/\eta R_1 \leq 1.17$. Specifically, the phosphors described in Embodiment 1 can be used.

Embodiment 3

Next, referring to FIGS. 11 and 12, a description is given of a light-emitting device and a projection apparatus according to Embodiment 3.

FIG. 11 illustrates structures of a light-emitting device and a projection apparatus according to Embodiment 3. (a) of FIG. 12 illustrates a wavelength conversion unit 16 used in a light-emitting device 101 according to Embodiment 3, viewed from a direction from which light emitted from a semiconductor light-emitting element enters. (b) of FIG. 12 is a cross-sectional view of the wavelength conversion unit 16 taken along line Ia-Ia in (a) of FIG. 12. In FIG. 11 and FIG. 12, the same reference numerals are assigned to the structural elements common to those in Embodiment 1, and the descriptions of the common elements are not given.

As FIG. 11 illustrates, a projection apparatus 199 according to Embodiment 3 mainly includes the light-emitting device 101, an image display element 50, and a projector lens 65.

The light-emitting device 101 emits wavelength-converted light 79 in which so-called red light, so-called green light, and only so-called blue light are temporally consecutive. The red light is light of a main emission wavelength ranging from 590 nm to 660 nm. The green light is light of a main emission wavelength ranging from 500 nm to 590 nm. The blue light is light of a main emission wavelength ranging from 430 nm to 500 nm. For example, the wavelength-converted light 79 is light in which one period is, for example, about 8.3 ms (120 Hz), and is radiation of three primary colors in the order of blue, green, and then red, for example.

The light-emitting device 101 includes, for example, a heat sink 25 and a plurality of (for example, 25) semiconductor light-emitting elements 11 (three are illustrated in FIG. 11) on the heat sink 25. Each of the semiconductor light-emitting elements 11 is a semiconductor laser, for example, whose light output is 2 W and center emission wavelength ranges from 400 nm to 430 nm. Emitted light 70 from the semiconductor light-emitting elements 11 is collected to a concave lens 13 by collimator lenses 12, and is caused to travel straight. Then the light passes through a dichroic mirror 14, so that light of 50 W is focused at a predetermined position of the wavelength conversion unit 16 by a condenser lens 15. Here, it is set such that the dichroic mirror 14 transmits light of a wavelength ranging from 380 nm to 430 nm, and reflects light of a wavelength ranging from 430 nm to 660 nm.

As (a) of FIG. 12 illustrates, the wavelength conversion unit 16 includes a disk-shaped metal plate, and phosphor layers 17B, 17G, and 17R formed over the surface of the metal plate. The phosphor layers 17B, 17G, and 17R are formed on the three divided regions on the same plane of the metal plate. The phosphor layers 17B, 17G, and 17R respectively include Eu-activated $Sr_3MgSi_2O_8$, Ce-activated $Y_3(Al, Ga)_5O_{12}$, and Ce-activated $Y_3Al_5O_{12}$, as phosphors. Moreover, as (b) of FIG. 12 illustrates, the wavelength conversion unit 16 according to Embodiment 3 includes: a metal plate 16a made of, for example, aluminum alloy; the phosphor layers 17B, 17G, and 17R which are formed on the metal plate 16a and are obtained by mixing the above phosphors to a binder such as an organic transparent material, for example, dimethyl silicone, or inorganic transparent material, for example, low-melting-point glass; and wavelength cutoff filters 40B, 40G, and 40R disposed immediately above the corresponding phosphor layers 17B, 17G, and 17R to improve the color purity of the wavelength-converted light 79 in a similar manner to Embodiment 1. Specifically, it is set such that the wavelength cutoff filter 40B reflects, for example, light of a wavelength of 500 nm or grater, the wavelength cutoff filter 40G reflects, for example, light of a wavelength of 610 nm or greater, and the wavelength cutoff filter 40R reflects, for example, light of a wavelength of 580 nm or less. More specifically, the wavelength cutoff filters 40B, 40G, and 40R are manufactured by disposing predetermined dielectric multi-layer films with different thickness for each region on a disk-shaped glass having a thickness of, for example, 0.1 mm.

The wavelength conversion unit 16 having such a structure is rotated by a rotating mechanism 20 and a rotating shaft 19 by a predetermined number of rotations. Rotation of the wavelength conversion unit 16 prevents emitted light 70 from being continuously emitted to specific positions on the phosphor layers 17B, 17G, and 17R. It is set such that the emission spectrum of wavelength-converted diffusion light 76 converted by the wavelength conversion unit 16 varies over time. Specifically, the emitted light 70, focused onto the wavelength conversion unit 16 and having a center wavelength ranging from 400 nm to 430 nm, is converted by the phosphors included in the phosphor layers 17B, 17G, and 17R as follows. The phosphor layer 17B converts the above light to light of a main emission wavelength ranging from 430 nm to 500 nm. The phosphor layer 17G converts the above light to light of a main emission wavelength ranging from 510 nm to 580 nm. The phosphor layer 17R converts the above light to light of a main emission wavelength ranging from 580 nm to 660 nm. The wavelength converted diffusion light 76 is converted by the condenser lens 15 to the wavelength-converted light 77 travelling straight again, is reflected off the dichroic mirror 14, passes through a condenser lens 131, and is emitted from the light-emitting device 101 as the wavelength-converted light 79.

Next, a description is given of a structure of the projection apparatus 199 which converts the wavelength-converted light 79 emitted from the light-emitting device 101 into video light 89.

The wavelength-converted light 79 emitted from the condenser lens 131 is collected, and enters a rod lens 132. The wavelength-converted light 79 multiply-reflected within the rod lens 132 is converted such that the light intensity distribution of the wavefront becomes rectangle, and is caused to travel straight by a convex lens 133. Then, the light is directed to the reflective image display element 50, such as a DMD, by a reflective mirror 35. The light emitted to the image display element 50 becomes signal light 80 on which two-dimensional video signal has been superimposed, and is reflected off the image display element 50. Then, the signal light 80 becomes the video light 89 that can be projected to a predetermined screen (not illustrated) by the projector lens 65, and is emitted from the projection apparatus 199.

In the above structure, in a similar manner to Embodiment 1, it is set such that the focused area of a focused portion 75 is 1 mm$^2$ or less, and that the excitation light density is 1 kW/cm$^2$ or greater. Accordingly, the phosphors used in the wavelength conversion unit 16 are set in a similar manner to those in Embodiment 1.

The wavelength-converted light 79 is emitted by the phosphor layers 17B, 17G, and 17R every predetermined period. Target white light can be emitted by adjusting the areas of the phosphor layers 17B, 17G, and 17R. Moreover, as described, selection of phosphor materials having small change in phosphor conversion efficiency relative to change in intensity of the excitation light allows a light-emitting device to have high energy conversion efficiency of the phosphor layers and small color deviation.

Variation of Embodiment 3

Next, referring to FIG. 13, a description is given of a light-emitting device according to Variation of Embodiment 3. FIG. 13 illustrates a structure of a light-emitting device according to Variation of Embodiment 3. Since the basic structure of the light-emitting device according to Variation of Embodiment 3 is the same as that of the light-emitting device 101 according to Embodiment 3, descriptions are mainly given to different points.

First, a wavelength conversion unit 16 according to Variation of Embodiment 3 includes a metal plate, and two phosphor layers 17B and 17G comprising different phosphor materials formed over the surface of the metal plate. Examples of the phosphor materials of the phosphor layer 17B include Eu-activated $Sr_3MgSi_2O_8$, and examples of the phosphor materials of the phosphor layer 17G include Ce-activated $Y_3(Al,Ga)_5O_{12}$. On the other hand, the light source which emits red light is prepared as a red semiconductor light-emitting element 211R serving as a red light-emitting diode comprising, for example, (Al,In,Ga,As,P) based material, and is arranged at a predetermined position. The optical path of the light source is combined by a dichroic mirror 14R.

The wavelength-converted diffusion light 76 converted by the wavelength conversion unit 16 in the above structure is vertically reflected off the dichroic mirror 14, passes through the dichroic mirror 14R, and is emitted from the light-emitting device 201 as wavelength-converted light 79. The red light with a peak wavelength of, for example, 630 nm emitted from the red semiconductor light-emitting element 211R is converted by a collimator lens 12R to emitted light 70R traveling straight. Then, the emitted light 70R is reflected off the dichroic mirror 14R. The emitted light 70R and the wavelength-converted light 79 are multiplexed by the dichroic mirror 14R such that they propagate along the same optical axis. Here, electric power applied to the semiconductor light-emitting elements 11 and the red semiconductor light-emitting element 211R of the light-emitting device 201 is adjusted according to the emission spectrum of emitted light from the light-emitting device 201. In other words, in order to emit blue light, only the semiconductor light-emitting elements 11 are operated, and light having a wavelength converted by the phosphor layer 17B is emitted. In order to emit green light, only the semiconductor light-emitting elements 11 are operated, and light having a wavelength converted by the phosphor layer 17G is emitted. On the other hand, in order to emit red light, the operation of the semiconductor light-emitting elements 11 is stopped and the red semiconductor light-emitting element 211R is operated. By performing the above operations in a predetermined cycle, white light can be emitted on a time average.

Accordingly, in a light-emitting device which converts light emitted from semiconductor lasers and emits the converted light, light saturation of the phosphors which emit blue light and green light can be reduced, and rapid decrease in energy conversion efficiency can be reduced. Additionally, when light output of the semiconductor light-emitting elements 11 decreases due to temperature rise or elapse of time, the color balance of blue, green, and red can be adjusted only by two types of light-emitting elements which are the semiconductor light-emitting elements 11 and the red semiconductor light-emitting element 211R.

In the above structure, a time domain may be provided in which the semiconductor light-emitting elements 11 and the red semiconductor light-emitting element 211R are simultaneously operated. In this case, other than the above blue, green and red light, a time domain in which yellow light is emitted from the light-emitting device 201 can be provided. Hence, color reproducibility of the projection apparatus including the light-emitting device 201 can be increased.

Additionally, in the above structure, a red super luminescent diode may be used as the red semiconductor light-emitting element 211R. Use of the red super luminescent diode can increase directivity of red light emitted from the light-emitting device, so that the numerical aperture of the collimator lenses 12R can be reduced. As a result, efficiency of optical system can be increased, and red light having reduced speckle noise can be used.

Embodiment 4

Next, referring to FIGS. 14 to 17, a description is given of a light-emitting device and a projection apparatus according to Embodiment 4.

FIG. 14 illustrates structures and operations of a light-emitting device and a projection apparatus including the light-emitting device according to Embodiment 4. FIG. 15 illustrates a structure of a wavelength conversion unit included in the light-emitting device according to Embodiment 4. FIG. 16 illustrates emission spectra and chromaticity coordinates of the light-emitting device and the projection apparatus according to Embodiment 4. FIG. 17 illustrates structures of other wavelength conversion units that can be used in the light-emitting device according to Embodiment 4.

As FIG. 14 illustrates, a projection apparatus 399 according to Embodiment 4 mainly includes: a light-emitting device 301 which emits wavelength-converted light 79 that is white light; dichroic mirrors 14R and 14B which separate the wavelength-converted light 79 into blue light, green light, and red light; three image display elements 50B, 50G, and 50R each of which is, for example, a liquid crystal panel element; and a projector lens 65.

The light-emitting device 301 includes: a heat sink 25; and a plurality of (for example, 25) semiconductor light-emitting elements 11 (three are illustrated in FIG. 14) on the heat sink 25. Each of the semiconductor light-emitting elements 11 is a semiconductor laser which provides light output at, for example, 2 W, and emits light with a center wavelength ranging from 400 nm to 430 nm. Emitted light from the semiconductor light-emitting elements 11 is collected to a concave lens 13 by collimator lenses 12, and is converted to emitted light 70 traveling straight and having light output of 50 W. The emitted light 70 passes through a dichroic mirror 14, and is focused to a predetermined position (focused portion 75) of a wavelength conversion unit 16 by a condenser lens 15.

As FIG. 15 illustrates, the wavelength conversion unit 16 includes: a disk-shaped metal plate 16a made of, for example, aluminum alloy; and a phosphor layer 17. The phosphor layer 17 is formed by applying the same phosphor material to a ring shaped region which is located closer to the outer periphery of the metal plate 16a and which has a predetermined width. For example, the phosphor layer 17 is formed by fixing, to the metal plate 16a, a mixture of an Eu-activated $Sr_3MgSi_2O_8$ phosphor, a Ce-activated $Y_3(Al,Ga)_5O_{12}$ phosphor, and a Ce-activated $Y_3Al_5O_{12}$ phosphor, mixed with a binder which is an organic transparent material such as dimethyl silicone, or an inorganic transparent material such as low-melting-point glass.

In Embodiment 4, a top surface of the wavelength conversion unit 16 is not provided with a wavelength cutoff filter which reflects light of specific wavelengths. The wavelength conversion unit 16 is rotated by a rotating mechanism 20 during the operation of the light-emitting device 301, so as to prevent the emitted light 70 from being emitted to a specific position of the phosphor layer 17. The emitted light 70 focused onto the phosphor layer 17 is converted into the wavelength converted diffusion light 76 having the spectrum of white light illustrated in (a) in FIG. 16, by the phosphors included in the phosphor layer 17 which are three types of phosphor materials which emit light with a center wavelength ranging from 400 nm to 430 nm. The wavelength converted diffusion light 76 is converted by the condenser lens 15 to wavelength-converted light 77 traveling straight again, is reflected off the dichroic mirror 14, and is emitted from the light-emitting device 301 as emitted light having directivity (wavelength-converted light 79).

The wavelength-converted light 79 emitted from the light-emitting device 301 is converted to vide light 89 within the projection apparatus 399 through the following operations. First, the wavelength-converted light 79 is separated by the dichroic mirror 14B into wavelength-converted light (blue light) 79B having a main wavelength of 430 nm to 500 nm and the remaining light that is wavelength-converted light (yellow light) 79Y.

The wavelength-converted light (blue light) 79B is reflected off reflective mirrors 31B and 32B, polarized by passing through a polarization element (not illustrated), and enters the image display element 50B. On the other hand, the wavelength-converted light (yellow light) 79Y is separated by the dichroic mirror 14R into wavelength-converted light (green light) 79G having a main wavelength ranging from 500 nm to 590 nm, and wavelength-converted light (red light) 79R having a main wavelength ranging from 590 nm to 660 nm. The wavelength-converted light (red light) 79R is reflected off reflective mirrors 31R and 32R, passes through a polarization element (not illustrated) in a similar manner to the wavelength-converted light 79B, and enters the image display element 50R. In a similar manner, the wavelength-converted light (green light) 79G passes through a polarization element (not illustrated), and enters the image display element 50G.

The wavelength-converted light 79B, 79G, and 79R respectively entering the image display elements 50B, 50G, and 50R is converted to signal light 80B, 80G, and 80R on which video information has been superimposed, by the image display elements 50B, 50G, and 50R and the polarization elements (not illustrated) disposed at the light exiting side of the image display elements 50B, 50G, and 50R. The signal light 80B, 80G, and 80R is then emitted to a dichroic prism 60 and multiplexed, thereby becoming combined light 85. The combined light 85 passes through the projector lens, thereby generating the video light 89. (b) of FIG. 16 illustrates spectra of the wavelength-converted light 79B, 79G, and 79R respectively entering the image display elements 50B, 50G, and 50R. (c) of FIG. 16 illustrates chromaticity coordinates of the wavelength-converted light 79B, 79G, and 79R, and the combined light 85 that is white light. In Embodiment 4, the wavelength-converted light 79B, 79G, and 79R are monochromatic light which has significantly high color purity and covers most of sRGB.

In the above structure, it is set such that the semiconductor light-emitting elements 11 emit light to the phosphor layer 17 at a light output of 10 W or greater, and that the focused area of the focused portion 75 is 1 mm$^2$ or less, that is, the excitation light density is 1 kW/cm$^2$ or greater.

With the light-emitting device 301 having such a structure, even when the excitation light density is changed from 5 kW/cm$^2$ to 1 kW/cm$^2$ relative to the chromaticity coordinates (x,y)=(0.304,0.328) and the color temperature of about 7000 K, x and y values are (0.304±0.01, 0.328±0.01). As a result, it is possible to achieve a light-emitting device having a small color deviation.

Accordingly, in a light-emitting device which converts light emitted from the semiconductor lasers and emits the converted light, light saturation of the phosphors can be reduced, and rapid decrease in energy conversion efficiency can be reduced. It is also possible to provide a projection apparatus whose color balance can be easily adjusted.

In regard to the structure of the phosphor layer of the wavelength conversion unit 316, as (a) and (b) of FIG. 17 illustrate, different phosphor materials may be applied to different phosphor regions. For example, as (a) of FIG. 17 illustrates, two phosphor regions may be included which are a phosphor layer 317B comprising a phosphor material mainly containing Eu-activated $Sr_3MgSi_2O_8$, and a phosphor layer 317Y comprising a phosphor material mainly containing Ce-activated $(Y,Gd)_3(Al,Ga)_5O_{12}$. Moreover, as (b) of FIG. 17 illustrates, two types of phosphors, a phosphor layer 317B and a phosphor layer 317Y, may be provided in plural regions (four regions for the phosphor layer 317B and four regions for the phosphor layer 317Y in (b) of FIG. 17). With such structures, blue light emitted from Eu-activated $Sr_3MgSi_2O_8$ is absorbed again by Ce-activated $(Y,Gd)_3(Al,Ga)_5O_{12}$, so that decrease in energy conversion efficiency of the wavelength conversion unit 316 can be reduced.

Variation of Embodiment 4

Next, referring to FIG. 18, a description is given of a light-emitting device according to Variation of Embodiment 4. FIG. 18 illustrates a structure of a light-emitting device according to Variation of Embodiment 4. Since the basic structure of a light-emitting device 401 according to Variation of Embodiment 4 is the same as that of the light-emitting device 301 according to Embodiment 4, descriptions are mainly given to different points.

Variation of Embodiment 4 is the same as Embodiment 4 in the structure in which emitted light 70 from the semiconductor light-emitting elements 11 is converted by the wavelength conversion unit 16, and up to the point the wavelength converted light is reflected off the dichroic mirror 14 as the wavelength converted diffusion light 76. The wavelength converted diffusion light 76 reflected off the dichroic mirror 14 is converted to collected light 479 by a condenser lens 432, and is emitted into an optical fiber 435 which is, for example, a glass, through an entrance end 435a. The collected light 479 entering the optical fiber 435 propagates through the optical fiber 435, and exits the optical fiber 435 through an exit end 435b of the optical fiber 435 as emitted light 480.

By arbitrarily changing the shape of the optical fiber 435 in the structure of the light-emitting device 401 according to Variation of Embodiment 4, it is possible to freely change the position of the exit end 435b. Moreover, by making the size of the exit end 435b, for example, 1 mm or less in diameter, it is possible to achieve a light-emitting device which provides small Etendue, high energy conversion efficiency of phosphor layers, and small color deviation even when light output of the excitation light sources changes.

Embodiment 5

Next, referring to FIG. 19, a description is given of a light-emitting device according to Embodiment 5. FIG. 19 illustrates a structure of a light-emitting device according to Embodiment 5.

As FIG. 19 illustrates, a light-emitting device 501 according to Embodiment 5 includes: a heat sink 25; and three semiconductor light-emitting elements 11 on the heat sink 25. Each of the semiconductor light-emitting elements 11 is a nitride semiconductor laser, for example, whose light output is 2 W and emission center wavelength is about 410 nm. The light-emitting device 501 further includes: a wavelength conversion unit 516; a light guiding component 535; and a reflector 530. The light guiding component 535 guides, to the wavelength conversion unit 516, emitted light 70 which is light emitted from the semiconductor light-emitting elements 11 and converted by the collimator lenses 12 into light traveling straight. The reflector 530 reflects, in a forward direction, wavelength-converted light 576 emitted from the wavelength conversion unit 516, and converts the wavelength-converted light 576 into emitted light 580b.

The reflector 530 includes, for example, a metal film such as Al or Ag, or an Al film provided with a protective film over the surface thereof. The light guiding component 535 is a component molded integrally with a support portion 516a of the wavelength conversion unit 516, and comprises a material, such as a low-melting-point glass, which does not absorb light of a wavelength of 400 nm or greater. The light guiding component 535 has, for example, a conical shape having a diameter decreasing toward the support portion 516a. By softening the tip portion of the light guiding component 535 with a high-temperature furnace or the like to cast the tip portion into a spherical shape, the support portion 516a can be integrally configured with the light guiding component 535. The support portion 516a is provided with a phosphor layer 517 thereon. Specifically, for example, a phosphor layer 517Y and a phosphor layer 517B sequentially cover the support portion 516a. The phosphor layer 517Y contains a phosphor, such as a Ce-activated $Y_3Al_5O_{12}$ phosphor, which emits yellow light with small change in energy conversion efficiency relative to change in excitation light density. The phosphor layer 517B contains a phosphor, such as an Eu-activated $Sr_3MgSi_2O_8$ phosphor, which emits blue light with small change in energy conversion efficiency relative to change in excitation light density. The phosphor layer 517Y and the phosphor layer 517B are obtained by mixing the above phosphors to a transparent material, such as silicone, and are fixed to the support portion 516a by molding or the like. Moreover, the light-emitting device 501 emits the emitted light 580b through a wavelength cutoff filter 540. In Embodiment 5, the wavelength cutoff filter 540 does not transmit light having a wavelength of 430 nm or less, for example, of light included in reflected light 580a from the reflector 530. In other words, the light-emitting device 501 does not directly emit light from the semiconductor light-emitting elements, that is, laser light.

Next, a description is given of an operation of the light-emitting device 501. Emitted light, for example, of 6 W from the three semiconductor light-emitting elements 11 is converted by the collimator lenses 12 into the emitted light 70 traveling straight. The emitted light 70 enters the light guiding component 535 through an entrance end 532 of the light guiding component 535. Light entering the light guiding component 535 is guided to the support portion 516a directly or while being fully-reflected by the surface of the light guiding component 535. The emitted light 70 entering the support portion 516a enters the phosphor layer 517Y or enters the phosphor layer 518B passing through the phosphor layer 517Y. Light entering the phosphor layers 517Y and 517B is respectively converted into yellow light and blue light, and is omnidirectionally emitted from the wavelength conversion unit 516 as the wavelength-converted light 576 that is white light. The wavelength-converted light 576 emitted from the wavelength conversion unit 516 is directed to the wavelength cutoff filter 540 directly, or reflected off the reflective surface of the reflector 530, converted into reflected light 580a and emitted in an upward direction in FIG. 19. When the wavelength-converted light 576 and the reflected light 580a pass through the wavelength cutoff filter 540, light having a wavelength of 430 nm or less, for example, is removed, and white light having a spectrum as illustrated in (a) of FIG. 16 is emitted.

In the above structure, if the wavelength conversion unit 516 has a spherical shape of 0.5 mm in diameter, for example, the surface area thereof is about 0.6 $mm^2$ in consideration of the area of the connection portion to the light guiding component 535, so that the excitation light density of phosphors is about 1 $kW/cm^2$. Hence, by using, as phosphor materials, combinations of phosphors having small amount of change in excitation light density dependency of energy, such as an Eu-activated $Sr_3MgSi_2O_8$ phosphor and a Ce-activated $Y_3Al_5O_{12}$ phosphor, it is possible to provide a light-emitting device which emits light with small color deviation even when light output of the semiconductor light-emitting elements 11 varies.

In Embodiment 5, in order to increase heat dissipation performance, minute unevenness may be formed on a surface of the substrate opposite to the surface from which excitation light is emitted.

Descriptions have been given of the light-emitting device and the projection apparatus according to the present disclosure based on the above embodiments and variations; but the present disclosure is not limited to the embodiments and the variations above.

For example, the Eu-activated $Sr_3MgSi_2O_8$ phosphor, the Eu-activated $BaMgAl_{10}O_{17}$ phosphor, the Ce-activated $Y_3(Al,Ga)_5O_{12}$ phosphor, and the Ce-activated $Y_3Al_5O_{12}$ phosphor are used as phosphors for blue light, green light, and red light included in the light-emitting devices and the projection apparatuses described in Embodiments 1 to 5; however, the present disclosure is not limited to the examples. For example, in order to obtain phosphors satisfying the conditions for the efficiency variation coefficient described above, Eu-activated CaAlSiN, Eu-activated (Sr,Ca)AlSiN, Eu-activated β-SiAlON, Eu-activated $(Sr,Ca,Ba)_3MgSi_2O_8$, Eu-activated $(Sr,Ca)_3MgSi_2O_8$, Eu-activated $(Sr,Ba)_3MgSi_2O_8$, Eu-activated $(Sr,Ca,Ba)_2MgSi_2O_7$, Eu-activated $(Sr,Ca)_2MgSi_2O_7$, Eu-activated $(Sr,Ba)_2MgSi_2O_7$ and the like may be used. Moreover, phosphors optimized by adjusting the europium concentration or the like in the above phosphors may be used.

Although only some exemplary embodiments and variations of the present disclosure have been described in detail above, those skilled in the art will readily appreciate that many modifications are possible in the exemplary embodiments and variations without materially departing from the novel teachings and advantages of the present disclosure. Accordingly, all such modifications are intended to be included within the scope of the present disclosure.

INDUSTRIAL APPLICABILITY

A light-emitting device according to the present disclosure, which converts light emitted from semiconductor lasers and emits the converted light, achieves reduced light saturation of phosphors, reduction in rapid decrease in energy conversion efficiency, and easy adjustment of color balance. The light-emitting device according to the present disclosure can be widely used not only for display illumination applications, such as a projector, a rear projection television, or a head-up display, but also vehicle illumination such as headlights, or medical illumination such as an endoscope.

The invention claimed is:
1. A light-emitting device comprising:
a semiconductor light-emitting element which emits light of a first wavelength; and
a first wavelength conversion unit including at least one type of a first phosphor and configured to emit light of a second wavelength by being excited by the light of the first wavelength, the light of the second wavelength being different from the light of the first wavelength;
wherein the first phosphor contains europium (Eu) as an activator,
the light of the first wavelength is emitted to the first wavelength conversion unit at a light density of 1 kW/cm$^2$ or greater, and
a relation of $1 \leq \eta 1_2/\eta 1_1 \leq 1.17$ is satisfied where $\eta 1$ is a light output ratio of the light of the first wavelength incident on the first wavelength conversion unit to the light of the second wavelength emitted from the first wavelength conversion unit, $\eta 1_1$ is a light output ratio obtained when the light of the first wavelength is emitted to the first wavelength conversion unit at a light density of 5 kW/cm$^2$, and $\eta 1_2$ is a light output ratio obtained when the light of the first wavelength is emitted to the first wavelength conversion unit at a light density of 2.5 kW/cm$^2$.

2. The light-emitting device according to claim 1,
wherein the semiconductor light-emitting element emits light of a wavelength ranging from 380 nm to 430 nm as the light of the first wavelength.

3. The light-emitting device according to claim 1,
wherein the first phosphor absorbs the light of the first wavelength emitted from the semiconductor light-emitting element, the first wavelength ranging from 380 nm to 430 nm.

4. The light-emitting device according to claim 1,
wherein the first phosphor has a peak fluorescence wavelength ranging from 430 nm to 660 nm.

5. The light-emitting device according to claim 4,
wherein the first phosphor has the peak fluorescence wavelength ranging from 430 nm to 500 nm.

6. The light-emitting device according to claim 1,
wherein the first phosphor has an Eu concentration x, where x≤7 mol %.

7. The light-emitting device according to claim 1,
wherein the first phosphor is either (i) a phosphor containing: at least one element selected from a group consisting of Sr, Ca, and Ba; Mg oxide; and Si oxide or (ii) a phosphor containing Ba, Mg oxide, and Al oxide.

8. The light-emitting device according to claim 7,
wherein the first phosphor is the phosphor containing: at least one element selected from the group consisting of Sr, Ca, and Ba; Mg oxide; and Si oxide, and has an Eu concentration x, where x≤2 mol %.

9. The light-emitting device according to claim 7,
wherein the first phosphor is the phosphor containing: at least one element selected from the group consisting of Sr, Ca, and Ba; Mg oxide; and Si oxide, and has an average particle size ranging from 2 μm to 20 μm.

10. The light-emitting device according to claim 7,
wherein the first phosphor is the phosphor containing Ba, Mg oxide, and Al oxide, and has an Eu concentration x, where x≤7 mol %.

11. The light-emitting device according to claim 1, comprising
a second wavelength conversion unit which includes a second phosphor which emits light of a wavelength ranging from 500 nm to 650 nm.

12. The light-emitting device according to claim 11,
wherein a relation of $1 \leq \eta 2_2/\eta 2_1 \leq 1.17$ is satisfied where $\eta 2$ is a light output ratio of the light of the first wavelength incident on the second wavelength conversion unit to the light emitted from the second wavelength conversion unit, $\eta 2_1$ is a light output ratio obtained when the light of the first wavelength is emitted to the second wavelength conversion unit at a light density of 5 kW/cm$^2$, and $\eta 2_2$ is a light output ratio obtained when the light of the first wavelength is emitted to the second wavelength conversion unit at a light density of 2.5 kW/cm$^2$.

13. The light-emitting device according to claim 11,
wherein the second phosphor comprises an aluminate phosphor containing Ce as an activator.

14. The light-emitting device according to claim 11,
wherein the second phosphor comprises Ce-activated $Y_3(Al,Ga)_5O_{12}$.

15. The light-emitting device according to claim 14,
wherein the second phosphor has an absorption spectrum with a maximum value ranging from wavelengths of 430 nm to 460 nm.

16. The light-emitting device according to claim 1, comprising
a third wavelength conversion unit which includes a third phosphor which emits light of a wavelength ranging from 580 nm to 660 nm.

17. The light-emitting device according to claim 16,
wherein a relation of $1 \leq \eta 3_2/\eta 3_1 \leq 1.17$ is satisfied when $\eta 3$ is a light output ratio of the light of the first wavelength incident on the third wavelength conversion unit to the light emitted from the third wavelength conversion unit, $\eta 3_1$ is a light output ratio obtained when the light of the first wavelength is emitted to the third wavelength conversion unit at a light density of 5 kW/cm$^2$, and $\eta 3_2$ is a light output ratio obtained when the light of the first wavelength is emitted to the third wavelength conversion unit at a light density of 2.5 kW/cm$^2$.

18. The light-emitting device according to claim 16,
wherein the third phosphor comprises an aluminate phosphor containing Ce as an activator.

19. The light-emitting device according to claim 16,
wherein the third phosphor comprises Ce-activated $(Y,Gd)_3(Al,Ga)_5O_{12}$.

20. The light-emitting device according to claim 1,
wherein the semiconductor light-emitting element includes at least one semiconductor laser.

21. A projection apparatus comprising:
the light-emitting device according to claim 1; and
a red semiconductor light-emitting element which emits light with a peak wavelength ranging from 580 nm to 660 nm.

* * * * *